US012659328B2

(12) United States Patent
Goel et al.

(10) Patent No.: US 12,659,328 B2
(45) Date of Patent: Jun. 16, 2026

(54) STATEFUL CLUSTERING METHODS

(71) Applicant: McAfee, LLC, San Jose, CA (US)

(72) Inventors: Ankit Goel, Uttar Pradesh (IN);
Abhishek Ajay Karnik, Hillsborro, OR
(US); Avelino Jr Rico, Portland, OR
(US); Mark Nichols Alferez Olea,
North Plains, OR (US)

(73) Assignee: McAfee, LLC, San Jose, CA (US)

( * ) Notice: Subject to any disclaimer, the term of this
patent is extended or adjusted under 35
U.S.C. 154(b) by 92 days.

(21) Appl. No.: 18/230,366

(22) Filed: Aug. 4, 2023

(65) Prior Publication Data

US 2025/0047696 A1     Feb. 6, 2025

(51) Int. Cl.
*H04L 9/40*         (2022.01)
*G06F 16/28*       (2019.01)
*H04L 9/32*         (2006.01)

(52) U.S. Cl.
CPC ........ *H04L 63/1425* (2013.01); *G06F 16/285*
(2019.01); *H04L 9/3239* (2013.01)

(58) Field of Classification Search
None
See application file for complete search history.

(56) References Cited

U.S. PATENT DOCUMENTS 7,373,667 B1 *  5/2008  Millard ................... H04L 63/14
                                                      709/227
11,483,327 B2 * 10/2022 Hen ...................... H04L 63/104

| | | | |
|---|---|---|---|
| 11,487,876 B1 | 11/2022 | Pryde | |
| 11,930,039 B1 * | 3/2024 | Geethakumar ..... | H04L 63/1416 |
| 2003/0144994 A1 * | 7/2003 | Wen .................... | G06F 16/9535 |
| 2008/0162530 A1 * | 7/2008 | van Eikeren ......... | G06F 40/106 |
| | | | 707/999.102 |

(Continued)

FOREIGN PATENT DOCUMENTS

CN           116166799 A       5/2023

OTHER PUBLICATIONS

Chakraborty, et al., "Analysis and Study of Incremental DVSCAN
Clustering Algorithm" Article, vol. 1 Issue 2 Jul. 2011, 15 pages,
International Journal of Enterprise Computing and Business Sys-
tems, ISSN (Online): 2230-8849, http://www.ijecbs.com, NIT Raipur,
CG, India.

(Continued)

*Primary Examiner* — Kaveh Abrishamkar
(74) *Attorney, Agent, or Firm* — Patent Capital Group

(57)                    ABSTRACT

There is disclosed a computer-implemented method of
assigning reputations to objects, including: for respective
samples in a dataset, extracting n features from a sample into
a feature vector, where n is an integer greater than 1;
assigning the sample a globally unique or pseudo-unique
identifier (GUID); according to a clustering algorithm, map-
ping the feature vector into an n-dimensional space and
computing distances between the sample and other samples
in the n-dimensional space; assigning groups of objects to
clusters according to their distances in the n-dimensional
space; correlating the clusters to cluster tags based on the
GUIDs of the samples, wherein the cluster tags are stored in
a persistent cluster tag storage; and assigning the sample a
reputation based on reputations of other samples in a cluster
that the sample clustered with.

20 Claims, 9 Drawing Sheets

(56)        References Cited

U.S. PATENT DOCUMENTS

| | | | | |
|---|---|---|---|---|
| 2011/0093464 A1* | 4/2011 | Cvet | G06F 16/355 | |
| | | | 707/E17.089 | |
| 2012/0254153 A1* | 10/2012 | Abraham | G06F 16/353 | |
| | | | 707/812 | |
| 2013/0097706 A1* | 4/2013 | Titonis | G06F 21/566 | |
| | | | 726/22 | |
| 2014/0324748 A1* | 10/2014 | Modica | G06N 20/00 | |
| | | | 706/20 | |
| 2015/0142707 A1* | 5/2015 | Charif | G06N 20/00 | |
| | | | 706/12 | |
| 2015/0332157 A1* | 11/2015 | Baughman | G06F 16/285 | |
| | | | 706/52 | |
| 2016/0180451 A1 | 6/2016 | Visbal et al. | | |
| 2016/0188719 A1* | 6/2016 | Glover | G06F 40/134 | |
| | | | 707/706 | |
| 2018/0373688 A1* | 12/2018 | Mukherjee | G06F 40/169 | |
| 2019/0179796 A1* | 6/2019 | Lakhman | G06N 3/08 | |
| 2020/0380380 A1* | 12/2020 | Ramachandran | G06N 5/025 | |
| 2021/0152581 A1* | 5/2021 | Hen | G06F 21/604 | |
| 2022/0292417 A1* | 9/2022 | Hen | G06Q 10/0635 | |
| 2023/0004590 A1* | 1/2023 | Li | G06N 7/01 | |
| 2023/0195913 A1* | 6/2023 | Qi | G06F 21/6218 | |
| | | | 726/30 | |
| 2024/0045928 A1* | 2/2024 | Burke | G06F 21/56 | |

OTHER PUBLICATIONS

Kim, et al., "DISC: Density-Based Incremental Clustering by Striding over Streaming Data" Article (2021), pp. 828-839, IEEE 37th International conference on Data engineering (ICDE), Department of Computer Science and Engineering, SNU, Seoul, Korea.
Wang, et al., "Theoretically-Efficient and Practical Parallel DBSCAN" Article, (Jan. 27, 2021) 20 pages, arXiv:1912.06255v4 [cs. DS], NIT Raipur, CG, India.

* cited by examiner

STATEFUL CLUSTERING METHODS

FIELD OF THE SPECIFICATION

This application relates in general to computer security, and more particularly though not exclusively to a system and method for providing stateful clustering methods.

BACKGROUND

An illustrative clustering algorithm groups objects according to a calculated distance between objects. Density-based spatial clustering of applications with noise (DB-SCAN) is a popular clustering algorithm. DBSCAN relies on a set of objects, with each object having a vector of n features. The algorithm maps each featurized object as a point in n-dimensional space, and computes clusters by first defining core points. Core points are those that have a given number of near neighbors. The algorithm then computes additional points that are within a distance from the core points. More points are chained together based on proximity to these points. Any points that are not "reachable" from a core point are considered outliers or noise.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
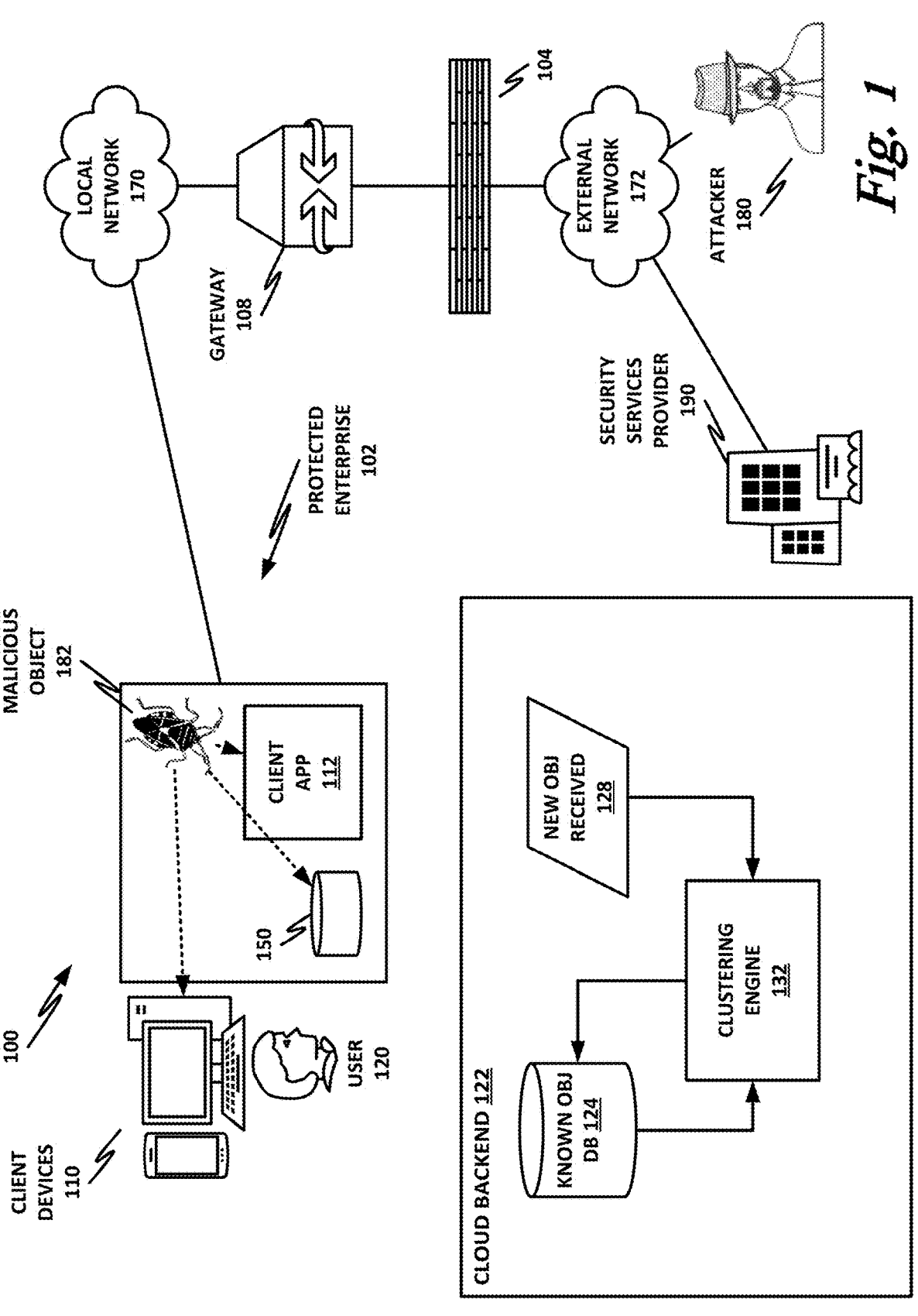
FIG. 1 is a block diagram of selected elements of a security ecosystem.

There is disclosed a computer-implemented method of assigning reputations to objects, including: for respective samples in a dataset, extracting n features from a sample into a feature vector, where n is an integer greater than 1; assigning the sample a globally unique or pseudo-unique identifier (GUID); according to a clustering algorithm, mapping the feature vector into an n-dimensional space and computing distances between the sample and other samples in the n-dimensional space; assigning groups of objects to clusters according to their distances in the n-dimensional space; correlating the clusters to cluster tags based on the GUIDs of the samples, wherein the cluster tags are stored in a persistent cluster tag storage; and assigning the sample a reputation based on reputations of other samples in a cluster that the sample clustered with.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Overview

DBSCAN is likely the most popular clustering algorithm in current use. A foundational principle of DBSCAN is to select a set of features that form and n-dimensional feature vector. The selected features are extracted from each object under analysis, and then the object is mapped as a point into n-dimensional space, with its position within the n-dimensional space being defined by the feature vector. This allows the system to compute distances between points/objects within the n-dimensional space. The designer may then select a distance $\varepsilon$ and the system may find objects that are within distance $\varepsilon$ of each other. Objects that are within distance $\varepsilon$ of each other are grouped into a cluster. The designer may also select a factor "minPts" (referred to herein as "k"), which represents a minimum number of points. For each point p, variable P may represent the number of points/objects that are within distance $\varepsilon$ of p, including p itself. For a given point $p_n$, selected from the dataset, if $P>k$, $p_n$ is considered a "core point" because it clusters with the minimum number of points. If $1<P<k$, then p is considered a noncore point. In this case, p is "near" at least one other point, but not enough points to form a core point. In large data sets, the great majority of points that cluster will become core points, because there are usually enough other samples that are similar. In an illustrative example, an antivirus signature database has over one million samples, and most of the samples that cluster will cluster as core points. For a point p with $P==1$ (i.e., it is not within distance $\varepsilon$ of any point other than itself), the point is an outlier. It is not similar enough to any other point to join a cluster.

The common DBSCAN algorithm is partially deterministic, in that if it is run on the same data in the same order, it will yield the same results. It is not however fully deterministic, because if the data are reordered, the core points will form the same clusters, but those clusters may be labeled differently. (Noncore points may "bridge" different clusters, and thus may be assigned to a different cluster based on the order of the data). A common method of performing DBSCAN includes forming an array of clusters, and assigning the first cluster found to the first position in the "Clusters[ ]" array and so on. Thus, if the data occur in a different order, then the clusters may be found in a different order, and may occupy different positions within Clusters[ ] based on when they happened to occur in the dataset. The points will still form up in the same clusters, but the clusters may appear in a different order from previous runs. Thus, although the same clusters form, the clustering algorithm is functionally stateless.

By way of illustration, the known DBSCAN algorithm can be expressed in pseudocode as follows:

```
DBSCAN (DB, distFunc, eps, minPts) {
    C := 0
    /* Cluster counter */
    for each point P in database DB {
        if label(P) ≠ undefined then continue
    /* Previously processed in inner loop */
        Neighbors N := RangeQuery(DB, distFunc, P, eps)
    /* Find neighbors */
        if |N| < minPts then {
    /* Density check */
            label(P) := Noise
    /* Label as Noise */
            continue
        }
        C := C + 1
    /* next cluster label */
        label(P) := C
    /* Label initial point */
        SeedSet S := N \ {P}
    /* Neighbors to expand */
        for each point Q in S {
    /* Process every seed point Q */
            if label(Q) = Noise then label(Q) := C
    /* Change Noise to border point */
            if label(Q) ≠ undefined then continue
    /* Previously processed (e.g., border point) */
            label(Q) := C
    /* Label neighbor */
            Neighbors N := RangeQuery(DB, distFunc, Q, eps)
    /* Find neighbors */
            if |N| ≥ minPts then {
    /* Density check (if Q is a core point) */
                S := S ∪ N
    /* Add new neighbors to seed set */
            }
        }
    }
}
```

RangeQuery can be implemented using a database index for better performance, or using a slow linear scan:

```
RangeQuery(DB, distFunc, Q, eps) {
    Neighbors N := empty list
    for each point P in database DB {
    /* Scan all points in the database */
        if distFunc(Q, P) ≤ eps then {
    /* Compute distance and check epsilon */
            N := N ∪ {P}
    /* Add to result */
        }
    }
    return N
}
```

The present specification describes a system and method for making the DBSCAN and other distance/clustering algorithms stateful. A stateful DBSCAN algorithm is considered herein "fully deterministic," in that deterministic DBSCAN results (cluster identities and core point-to-cluster mappings) persist across runs, regardless of data order. An exception to statefulness is that noncore points may be excluded from persistence across runs. In some use cases, noncore points may be considered less statistically meaningful, because they can map to more than one cluster, and depending on data order, may map to different clusters on different runs. Thus, a noncore point carries less meaningful information than a core point, because its cluster mapping may be a result of chance or an artifact of data order. For example, in a malware scanning use case, a sample that maps as a core point to a cluster may be assumed, with high confidence, to share the properties of that cluster. But if the sample maps as a noncore point, then the match may be lower confidence because the sample could also map to a different cluster if DBSCAN were run with the same data in a different order. Because noncore points are inherently nondeterministic, maintaining their states between runs may not be beneficial. It is possible to achieve statefulness with respect to noncore points by recording, such as in a nonvolatile memory, which cluster each noncore point mapped to. In some cases, it may be beneficial to record which cluster a noncore point mapped to, although that information should not be used in reverse to uniquely map a cluster to its cluster tag.

To make the DBSCAN algorithm stateful, each object is assigned a globally unique identifier (GUID). Any suitable algorithm may be used to assign the GUID. One illustrative example is SHA256. SHA256 computes a 256-bit hash for each object. The SHA256 hash can be computed for example by concatenating the values from the feature vector together to form a single string. This concatenated string can then be hashed according to the SHA256 algorithm, and it may be unnecessary to check for duplicates. For context, an estimated number of grains of sand on the earth is on the order of $10^{50}$. If SHA256 hashes were computed for each of $10^{50}$ unique objects, the probability of a duplicate is on the order of $10^{-100}$. Stated otherwise, there is approximately one in a googol ($10^{100}$) chance of two grains of sand getting the same SHA256 hash if they are properly featurized, which for practical purposes is a zero chance. However, it is feasible to perform collision checks, particularly in cases where a less robust hashing algorithm is used, or if there is some other reason to perform collision checks. Using a suitable GUID algorithm, the deterministic DBSCAN can either verify, or assume with high confidence (even astronomically high confidence), that each object has a unique GUID. One limitation may arise from the feature vector, if it is not sufficiently detailed. DBSCAN may detect and drop duplicate objects, as the same feature vector will yield the same mapping. This is desirable behavior if the objects are, in fact, the same object. It may be undesirable in cases where objects share some similarity but are not truly identical. As appropriate, the feature vector may be selected with sufficient resolution to discriminate objects from one another, helping to ensures that a given object will receive a same hash if and only if it is the same object.

Advantageously, the feature vector itself carries sufficient information to reconstruct the GUID between runs, so that the GUID becomes a stateful datum between runs, regardless of the data order. Advantageously, because the feature vector contains sufficient information to reconstruct the GUID, the stateful data need not be stored separately alongside the object. Indeed, two completely different systems in two completely different enterprises using the same objects, the same feature vectors, and the same DBSCAN algorithm will calculate the same stateful data for each object.

The benefits of a stateful DBSCAN algorithm can be illustrated in the use case of a malware detection ecosystem, although the utility of the algorithm is not limited to this application. Antivirus technology is decades old, and one of the most straightforward and effective methods of detecting new malware is to form a cluster using DBSCAN, featurize a new security object or group of security objects, and then determine which cluster the new the new sample or samples belong to. If the new sample clusters strongly with other samples that are known to be malicious or to have other undesirable features, then the system can assume with high confidence that the new sample shares those features. Advantageously, many DBSCAN implementations are very fast, so clustering can be done very quickly. This gives a security services vendor the ability to quickly characterize new objects found in the wild. This initial characterization may be followed up with additional analysis such as static or dynamic analysis to increase confidence in the object's characteristics.

A challenge for security services vendors is that because their databases are decades-old, they have tens to hundreds of millions of known objects in their databases. Because existing DBSCAN implementations are not stateful, these vendors may rerun the full data set to characterize new objects. As the data sets become increasingly large, rerunning the scan regularly becomes more difficult in terms of time and compute resources. But with a stateful DBSCAN algorithm, an incremental scan can be run comparing only a subset of the known objects to a set of new objects.

Because the stateful DBSCAN algorithm is fully deterministic, the new clusters can be mapped to an existing cluster space, and newly identified samples can be correctly assigned to existing groups. Thus, with a stateful DBSCAN algorithm, there is no need to rescan the entire data set for each clustering instance. Smaller subsets can be used, such as taking a handful of core samples from each cluster of the existing data set, and clustering the new samples with those selected known samples. A security services vendor or other user of the novel DBSCAN algorithm can then confidently assign the new objects to clusters and operate on those clusters.

The system and method disclosed herein addresses certain limitations in the existing DBSCAN algorithm. While DBSCAN is partially deterministic in that it will generate the same clusters if run on the same data the same order, cluster labels will change if the order of data changes, and non-core samples might fall into a different cluster. Thus existing DBSCAN implementations may not be suitable for cases where it is impractical to maintain the order of the data, or it may be necessary to re-run the full scan in those cases.

The system and method disclosed herein makes DBSCAN stateful and fully deterministic by providing an updated algorithm that can map clusters and multiple runs to the same clusters. This ensures that even when new data are added or if the order of data changes, the old clusters will remain intact or will expand if new points cluster with them.

Advantageously the system and method disclosed herein retains data integrity in retraining situations. The disclosed method provides deterministic results even when new data are added and avoids the need to analyze clusters independently every time.

The method disclosed herein also provides the ability to perform clustering in sliding window approaches, where it may not be desirable or practical to cluster in a single pass as all data points may not be available, or because the scale of the data set has exceeded the practical limits of the computer resources. Thus, one advantage of the present specification is to make the DBSCAN algorithm more scalable. Data can be divided into overlapping chunks, and DBSCAN or another clustering algorithm can be run independently on each chunk. The overlapping results can then be used to map clusters from the different runs to the correct cluster tags.

Furthermore, the teachings of the present specification are not limited to DBSCAN. Other clustering algorithms are also known to be stateless, and the teachings of the present specification can be used to make other stateless clustering algorithms stateful. In particular, if those clustering algorithms use distance-based metrics, and are partially deterministic, the teachings of the present specification can make them fully or near fully deterministic. Additional distance-based clustering algorithms that may be used with the teachings of this specification include, but are not limited to, ordering points to identify the clustering structure (OPTICS), hierarchical DBSCAN (HDBSCAN), generalized DBSCAN (GDBSCAN), PreDeCon, parallelized PreDeCon (PPreDeCon), and SUBCLU.

An illustrative implementation of the present specification includes an algorithm that may be encoded into a circuit, such as in an ASIC or FPGA or other custom hardware, or may be embodied within executable instructions stored on one or more computer readable media which may be transitory or non-transitory, and tangible or intangible. Such media may include instructions executable by a processor circuit, which instructions instruct the processor circuit to carry out the algorithm on a dataset comprising a plurality of samples or objects. The algorithm may include defining a set of features for each sample, and for each sample extracting n features to yield a unique feature vector for that sample. The sample may be mapped into an n-dimensional space and an algorithm such as DBSCAN may be used to compute the distance between the sample and other samples in the n-dimensional space. Furthermore, a GUID may be assigned to each sample. An illustrative method of assigning the GUID is to concatenate the feature vector values into a string, and then to compute a SHA256 hash or other hash or checksum of the string. SHA256 has a negligible collision rate, and can be used with a high confidence that each sample will receive a truly unique GUID. In other embodiments, other methods for assigning a GUID (either a guaranteed unique GUID, or a pseudo-unique GUID, which is not necessarily guaranteed to be unique, but which is unique within a high confidence) may be used. The GUID for each sample can usefully provide persistence (i.e., statefulness) between different runs of the DBSCAN algorithm.

The algorithm may then select only core samples or in other words ignore boundary points as they might fall into different clusters on different runs. One advantage of this is that because core samples will always be clustered into the same cluster (assuming the same data set, and regardless of order), there is a one-to-one mapping between core samples and the data set identifier. Thus, on the first run, after points have been grouped into clusters, the system or a human operator may assign a "cluster tag" to respective clusters, which may be another GUID or even a human-readable name. Core points have a one-to-one mapping with their clusters, so a cluster can be uniquely identified from any core point that maps into it. By keeping only core points for the stateful clustering, the algorithm ensures that whatever position a cluster assumes in the Clusters[ ] array, it can be mapped to the same cluster with the appropriate cluster tag (e.g., a GUID or human-readable name) from a previous run.

For later runs of the algorithm, the system may merge old clustering data with new clustering data, resulting in unique identifiers for each new cluster. If new samples have been added to an old cluster, then that cluster can be mapped to the previous cluster tag. If new clusters are formed, those new clusters can be assigned a new cluster tag.

Selected Examples

The foregoing can be used to build or embody several example implementations, according to the teachings of the present specification. Some example implementations are included here as nonlimiting illustrations of these teachings.

Example 1 includes a computer-implemented method of assigning reputations to objects, comprising: for respective samples in a dataset, extracting n features from a sample into a feature vector, where n is an integer greater than 1; assigning the sample a globally unique or pseudo-unique identifier (GUID); according to a clustering algorithm, mapping the feature vector into an n-dimensional space and computing distances between the sample and other samples in the n-dimensional space; assigning groups of objects to clusters according to their distances in the n-dimensional space; correlating the clusters to cluster tags based on the GUIDs of the samples, wherein the cluster tags are stored in a persistent cluster tag storage; and assigning the sample a reputation based on reputations of other samples in a cluster that the sample clustered with.

Example 2 includes the method of example 1, wherein the dataset comprises data representing computer software objects, and wherein the reputation comprises a reputation for maliciousness.

Example 3 includes the method of example 2, wherein assigning the sample the reputation comprises assigning the sample a reputation for maliciousness prevalent among other samples in the cluster that the sample clustered with.

Example 4 includes the method of example 2, wherein assigning the sample the reputation comprises computing a reputation from reputations of objects in the cluster that the sample clustered with, wherein the reputation is computed according to ceiling, floor, mode, median, or mean reputation.

Example 5 includes the method of example 3, wherein the reputation is a provisional reputation.

Example 6 includes the method of example 1, wherein the dataset is selected from geographical coordinate data, wherein the reputation comprises geographic proximity, image segmentation data, wherein the reputation comprises spatial proximity, market or customer segmentation data, wherein the reputation comprises target market segment or customer base discrimination, social network data, wherein the reputation comprises social connectivity, network analysis data, wherein the reputation comprises node density data, time series data, wherein the reputation comprises temporal proximity of events, or software objects, wherein the reputation comprises a reputation for maliciousness.

Example 7 includes the method of example 1, wherein correlating the clusters to cluster tags comprises discarding noncore samples.

Example 8 includes the method of example 1, wherein assigning the GUID comprises using a hash value derived from the sample.

Example 9 includes the method of example 1, wherein assigning the GUID comprises concatenating values from the feature vector, and computing a single SHA256 hash of the concatenated values.

Example 10 includes the method of example 1, further comprising identifying one or more new clusters that do not have previously-assigned cluster tags, and assigning cluster tags to the new clusters.

Example 11 includes the method of example 1, wherein the cluster tags are GUIDs.

Example 12 includes the method of example 1, wherein the cluster tags are human-readable tags.

Example 13 includes the method of example 1, wherein the dataset comprises more than one million objects.

Example 14 includes the method of example 1, wherein the method performs an incremental run of the clustering algorithm.

Example 15 includes the method of example 1, wherein the persistent cluster tag storage comprises a structured query language (SQL) or NoSQL database.

Example 16 includes the method of example 1, wherein the persistent cluster tag storage comprises a content-addressable memory (CAM).

Example 17 includes the method of example 1, wherein assigning the groups of objects to clusters comprises performing an incremental scan on the dataset.

Example 18 includes the method of example 1, wherein assigning the groups of objects to clusters comprises performing an incremental scan on a subset of the dataset comprising less than all of the dataset.

Example 19 includes the method of any of examples 1-18, wherein the clustering algorithm is density-based spatial clustering of applications with noise (DBSCAN).

Example 20 includes the method of any of examples 1-18, wherein the clustering algorithm is a distance-based clustering algorithm.

Example 21 includes the apparatus comprising means for performing the method of any of examples 1-17.

Example 22 includes the apparatus of example 21, wherein the means for performing the method comprise a processor and a memory.

Example 23 includes the apparatus of example 22, wherein the memory comprises machine-readable instructions that, when executed, cause the apparatus to perform the method of any of examples 1-17.

Example 24 includes the apparatus of any of examples 21-23, wherein the apparatus is a computing system.

Example 25 includes the least one computer readable medium comprising instructions that, when executed, implement a method or realize an apparatus as in any of examples 1-24.

Example 26 includes one or more tangible, nontransitory computer-readable storage media having stored thereon executable instructions that, when executed by a processor circuit, cause the processor circuit to: for respective samples in a dataset, extract features from a sample into a feature vector; assign the sample an identifier; according to a clustering algorithm, map the feature vector into a multi-dimensional sample space, and compute distances between the sample and other samples in the multi-dimensional sample space; cluster groups of objects into clusters according to their mutual distances in the multi-dimensional sample space; correlate the clusters to cluster tags based on the identifiers of the samples, wherein the cluster tags are stored in a persistent cluster tag storage; and assign the sample a reputation based on reputations of other samples that it clustered with.

Example 27 includes the one or more tangible, nontransitory computer-readable storage media of example 26, wherein the dataset comprises data representing computer software objects, and wherein the reputation comprises a reputation for maliciousness.

Example 28 includes the one or more tangible, nontransitory computer-readable storage media of example 27, wherein assigning the sample the reputation comprises assigning the sample a reputation for maliciousness prevalent among other samples in the cluster that the sample clustered with.

Example 29 includes the one or more tangible, nontransitory computer-readable storage media of example 27, wherein assigning the sample the reputation comprises computing a reputation from reputations of objects in the cluster that the sample clustered with, wherein the reputation is computed according to ceiling, floor, mode, median, or mean reputation.

Example 30 includes the one or more tangible, nontransitory computer-readable storage media of example 29, wherein the reputation is a provisional reputation.

Example 31 includes the one or more tangible, nontransitory computer-readable storage media of example 26, wherein the dataset is selected from geographical coordinate data, wherein the reputation comprises geographic proximity, image segmentation data, wherein the reputation comprises spatial proximity, market or customer segmentation data, wherein the reputation comprises target market segment or customer base discrimination, social network data, wherein the reputation comprises social connectivity, network analysis data, wherein the reputation comprises node density data, time series data, wherein the reputation comprises temporal proximity of events, or software objects, wherein the reputation comprises a reputation for maliciousness.

Example 32 includes the one or more tangible, nontransitory computer-readable storage media of example 26, wherein correlating the clusters to cluster tags comprises discarding noncore samples.

Example 33 includes the one or more tangible, nontransitory computer-readable storage media of example 26, wherein assigning the identifier comprises using a hash value derived from the sample.

Example 34 includes the one or more tangible, nontransitory computer-readable storage media of example 26, wherein assigning the identifier comprises concatenating values from the feature vector, and computing a single SHA256 hash of the concatenated values.

Example 35 includes the one or more tangible, nontransitory computer-readable storage media of example 26, further comprising identifying one or more new clusters that do not have previously-assigned cluster tags, and assigning cluster tags to the new clusters.

Example 36 includes the one or more tangible, nontransitory computer-readable storage media of example 26, wherein the cluster tags are GUIDS.

Example 37 includes the one or more tangible, nontransitory computer-readable storage media of example 26, wherein the cluster tags are human-readable tags.

Example 38 includes the one or more tangible, nontransitory computer-readable storage media of example 26, wherein the dataset comprises more than one million objects.

Example 39 includes the one or more tangible, nontransitory computer-readable storage media of example 26, wherein the instructions are to perform an incremental run of the clustering algorithm.

Example 40 includes the one or more tangible, nontransitory computer-readable storage media of example 26, wherein the persistent cluster tag storage comprises a structured query language (SQL) or NoSQL database.

Example 41 includes the one or more tangible, nontransitory computer-readable storage media of example 26, wherein the persistent cluster tag storage comprises a content-addressable memory (CAM).

Example 42 includes the one or more tangible, nontransitory computer-readable storage media of example 26, wherein clustering groups of objects comprises performing an incremental scan on the dataset.

Example 43 includes the one or more tangible, nontransitory computer-readable storage media of example 26, wherein clustering groups of objects comprises performing an incremental scan on a subset of the dataset comprising less than all of the dataset.

Example 44 includes the one or more tangible, nontransitory computer-readable storage media of any of examples 26-43, wherein the clustering algorithm is density-based spatial clustering of applications with noise (DBSCAN).

Example 45 includes the one or more tangible, nontransitory computer-readable storage media of any of examples 26-43, wherein the clustering algorithm is a distance-based clustering algorithm.

Example 46 includes a computing apparatus realized on one or more hardware platforms, comprising: at least one processor circuit; at least one memory circuit; a persistent cluster tag storage; and instructions encoded within the at least one memory circuit to instruct the at least one processor circuit to: for a sample object taken from a dataset, create a feature vector comprising n discrete features, wherein objects in the dataset have globally unique or pseudo-unique identifiers (GUIDs); assign the sample object a GUID; according to a clustering algorithm, cluster the sample object into one or more clusters with other objects in the dataset based on feature vector distances; correlate the one or more clusters to cluster tags from the persistent cluster tag storage, based on the GUIDs of the objects; and assign the sample object a reputation based on reputations of other samples that it clustered with.

Example 47 includes the computing apparatus of example 46, wherein the dataset comprises data representing computer software objects, and wherein the reputation comprises a reputation for maliciousness.

Example 48 includes the computing apparatus of example 47, wherein assigning the sample object the reputation comprises assigning the sample object a reputation for maliciousness prevalent among other samples in the cluster.

Example 49 includes the computing apparatus of example 47, wherein assigning the sample object the reputation comprises computing a reputation from reputations of objects in the cluster, wherein the reputation is computed according to ceiling, floor, mode, median, or mean reputation.

Example 50 includes the computing apparatus of example 49, wherein the reputation is a provisional reputation.

Example 51 includes the computing apparatus of example 46, wherein the dataset is selected from geographical coordinate data, wherein the reputation comprises geographic proximity, image segmentation data, wherein the reputation comprises spatial proximity, market or customer segmentation data, wherein the reputation comprises target market segment or customer base discrimination, social network data, wherein the reputation comprises social connectivity, network analysis data, wherein the reputation comprises node density data, time series data, wherein the reputation comprises temporal proximity of events, or software objects, wherein the reputation comprises a reputation for maliciousness.

Example 52 includes the computing apparatus of example 46, wherein correlating the one or more clusters to cluster tags comprises discarding noncore samples.

Example 53 includes the computing apparatus of example 46, wherein assigning the GUID comprises using a hash value derived from the sample object.

Example 54 includes the computing apparatus of example 46, wherein assigning the GUID comprises concatenating values from the feature vector, and computing a single SHA256 hash of the concatenated values.

Example 55 includes the computing apparatus of example 46, further comprising identifying one or more new clusters that do not have previously-assigned cluster tags, and assigning cluster tags to the new clusters.

Example 56 includes the computing apparatus of example 46, wherein the cluster tags are GUIDs.

Example 57 includes the computing apparatus of example 46, wherein the cluster tags are human-readable tags.

Example 58 includes the computing apparatus of example 46, wherein the dataset comprises more than one million objects.

Example 59 includes the computing apparatus of example 46, wherein the instructions are to perform an incremental run of the clustering algorithm.

Example 60 includes the computing apparatus of example 46, wherein the persistent cluster tag storage comprises a structured query language (SQL) or NoSQL database.

Example 61 includes the computing apparatus of example 46, wherein the persistent cluster tag storage comprises a content-addressable memory (CAM).

Example 62 includes the computing apparatus of example 46, wherein clustering the sample object comprises performing an incremental scan on the dataset.

Example 63 includes the computing apparatus of example 46, wherein clustering the sample object comprises performing an incremental scan on a subset of the dataset comprising less than all of the dataset.

Example 64 includes the computing apparatus of any of examples 46-63, wherein the clustering algorithm is density-based spatial clustering of applications with noise (DB-SCAN).

Example 65 includes the computing apparatus of any of examples 46-63, wherein the clustering algorithm is a distance-based clustering algorithm.

DETAILED DESCRIPTION OF THE DRAWINGS

A system and method for stateful clustering will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In the example of FIG. 1, security ecosystem 100 may be an enterprise, a small business, a charity, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Security ecosystem 100 may include one or more protected enterprises 102. A single protected enterprise 102 is illustrated here for simplicity, and could be a business enterprise, a government entity, a family, a nonprofit organization, a church, or any other organization that may subscribe to security services provided, for example, by security services provider 190.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, internet of things (IoT) devices, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 could be a simple home router, or could be a sophisticated enterprise infrastructure including routers, gateways, firewalls, security services, deep packet inspection, web servers, or other services.

In further embodiments, gateway 108 may be a stand-alone internet appliance. Such embodiments are popular in cases in which ecosystem 100 includes a home or small business. In other cases, gateway 108 may run as a virtual machine or in another virtualized manner. In larger enterprises that features service function chaining (SFC) or NFV, gateway 108 may be include one or more service functions and/or virtualized network functions.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE Corp. provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming a device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Protected enterprise 102 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC, or similar competing products. Security services provider 190 may update its threat intelligence database by analyzing new candidate malicious objects as they appear on client networks and characterizing them as malicious or benign.

Security services provider 190 may operate a cloud backend 122. Cloud backend 122 may be hosted on a data center owned by security services provider 190, or in a third-party cloud as appropriate. Cloud backend 122 may be configured to perform clustering for various purposes, such as the illustrative use case of detecting and classifying malicious objects such as malicious object 182. Cloud backend 122 may include a clustering engine 132. Clustering engine 132 may cluster a large number of known objects, which in the case of an established security services vendor, may include tens of millions of known objects. These known objects may have been subjected to detailed characterization such as via static or dynamic analysis, or human analysis. Characteristics of known objects may be stored in known objects database 124. Known objects database 124 may include the objects themselves, hashes of the objects, feature vectors for the objects, and/or clustering information the data set.

Cloud backend 122 may receive new object 128. When cloud backend 122 receives new object 128, it may be desirable to classify new object 128. This classification may include for example static or dynamic analysis, behavioral analysis over time, or other characterization. As an additional characterization, or as a first pass to quickly characterize new object 128 (e.g., before detailed characterization can be performed), clustering engine 132 may use DBSCAN or another clustering algorithm to assign new object 128 to a known cluster. If new object 128 clusters with objects that are known Trojans, worms, malicious PEs, or other malicious objects, then there is an elevated probability that new object 128 is also malicious. Alternatively, if new object 128 clusters with known objects that are useful and benign, there is a higher probability that new object 128 is also useful and benign.

While it is possible to collect new objects 128 into batches, and then periodically retrain clustering engine 132 on the entire data set, the problem may scale poorly. Because the existing DBSCAN algorithm is stateless, a full re-scan of the entire dataset may be required to add even a single new object to the dataset. It is possible to run clustering on a partial data set, such as by excluding from the training some of the oldest objects, or objects that have not been encountered in the wild within a certain time, but partial scans provide only partial results. While this may reduce the demand on time and compute resources, it also loses information that may be useful. Thus, cloud backend 122 may benefit by provisioning clustering engine 132 with the novel method illustrated herein. Because the novel method is stateful and deterministic, there is no loss of information by training clustering engine 132 on a partial data set of only selected data. After an incremental scan on a partial dataset using a stateful clustering scan, the results can be mapped back to the full data set using the GUIDs assigned to each core point to map the core points to their associated cluster tags. The result is that new object 128 can be mapped into the existing result set as though the entire data set had been retrained on clustering engine 132.

Figure 2:
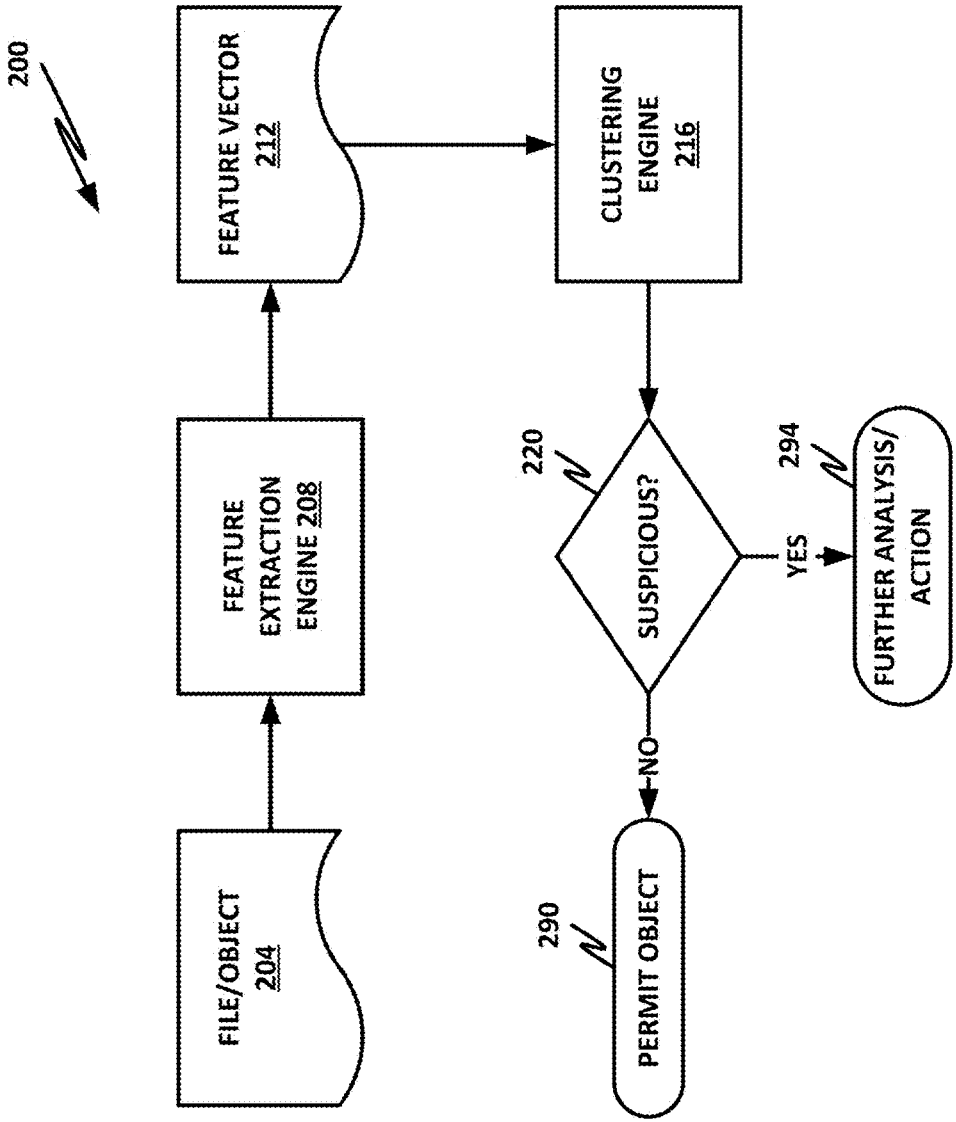
FIG. 2 is a block diagram of selected aspects of a malware analysis pipeline.
Figure 8:
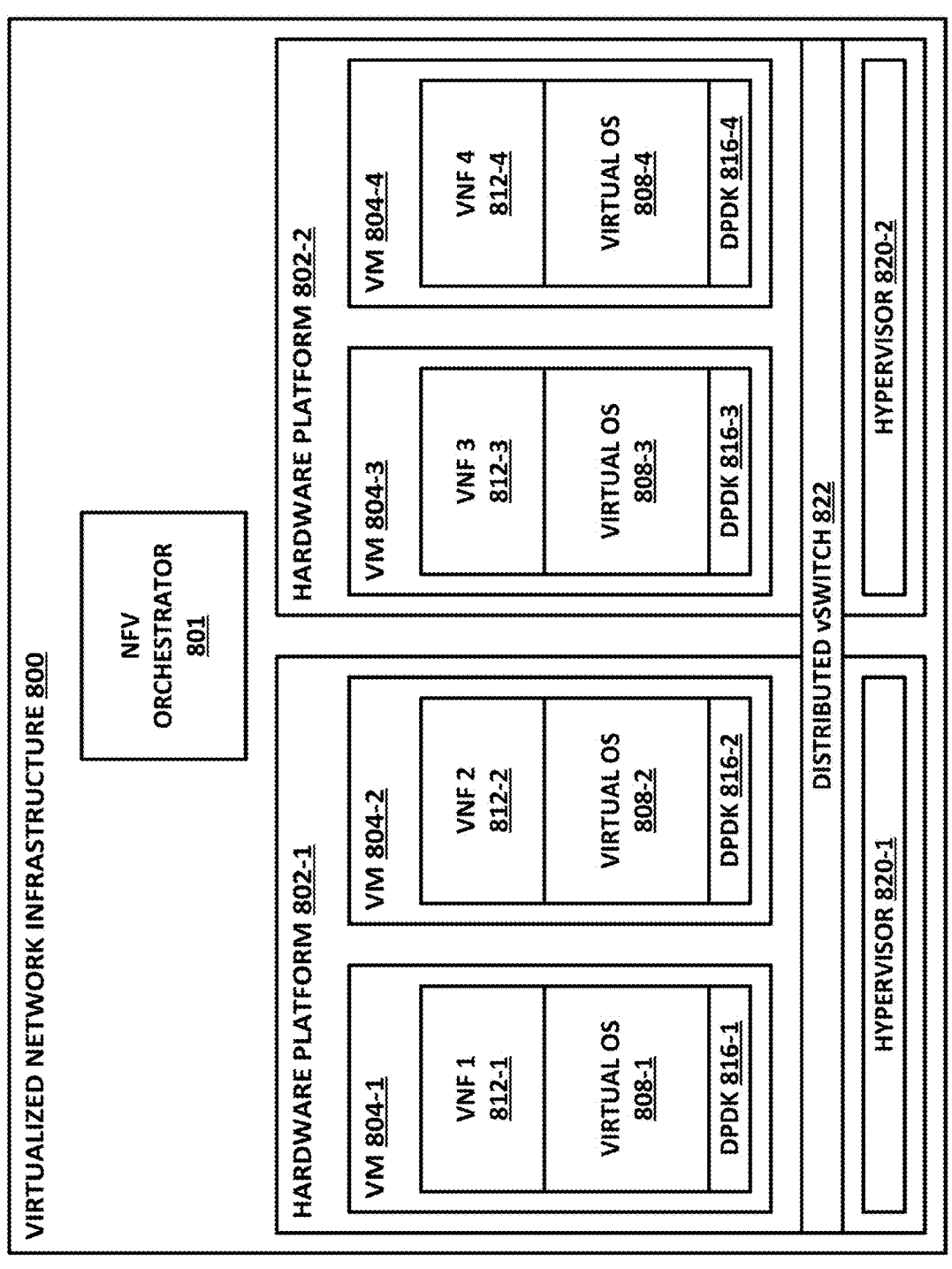
FIG. 8 is a block diagram of selected elements of a network function virtualization (NFV) infrastructure.
Figure 9:
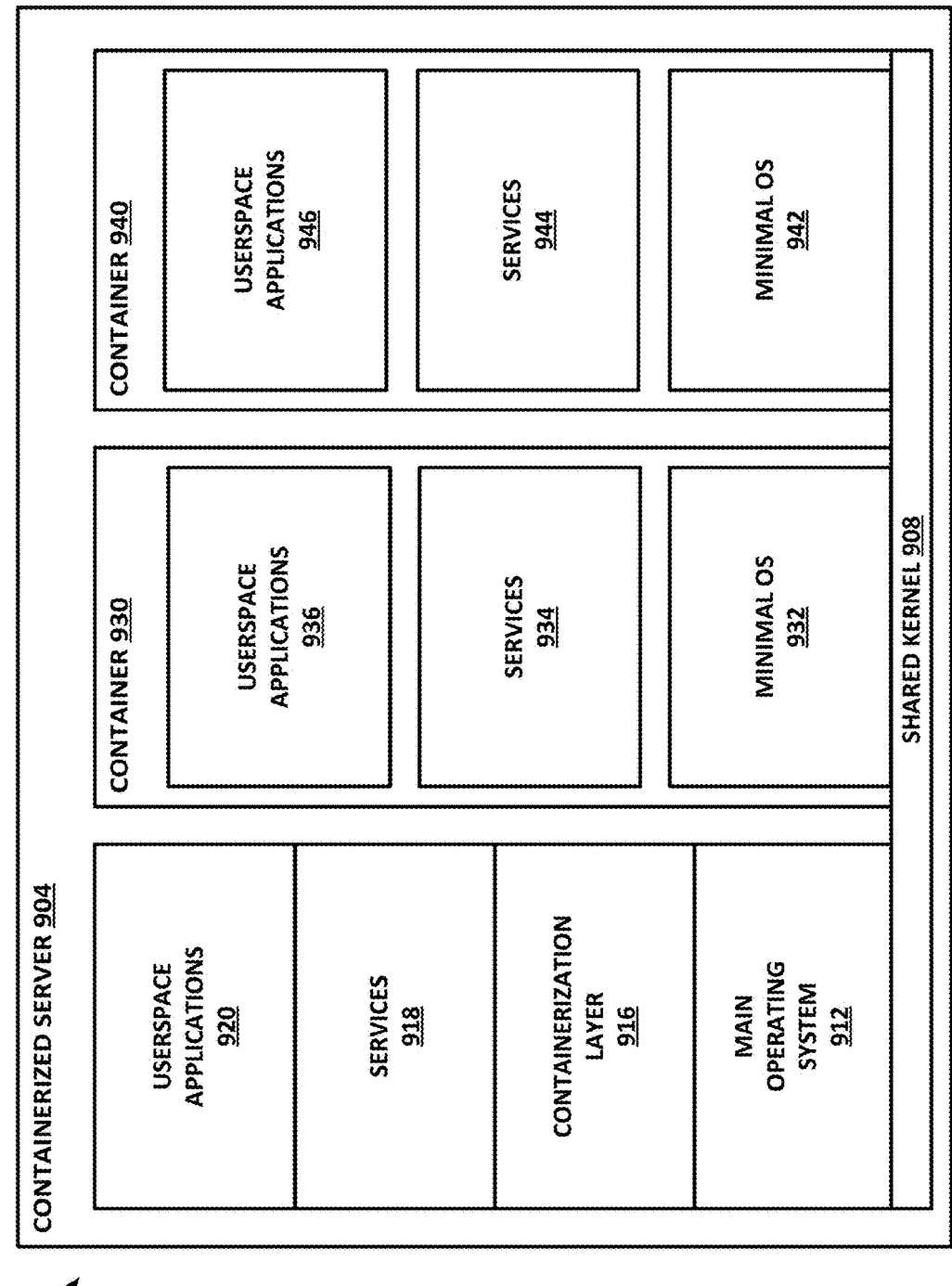
FIG. 9 is a block diagram of selected elements of a containerization infrastructure.

FIG. 2 is a block diagram of selected elements of a clustering pipeline 200. Clustering pipeline 200 illustrates, for example, some operational elements that may be found in clustering engine 132 or in different embodiments. Clustering pipeline 200 may be embodied, by way of illustration, in a single general-purpose computing device, a server-class computer, a system-on-a-chip (SoC) (which may include custom hardware or accelerators to make computations faster), a dedicated or standalone appliance, a mainframe, a virtual machine (as illustrated in FIG. 8 below) or a container (as illustrated in FIG. 9 below). Furthermore, various functions may be distributed among different compute elements or instances of the foregoing, or among any combination of the foregoing.

Beginning the pipeline, the system receives a new file or object 204 to be analyzed. This new file or object is treated as a sample for the clustering algorithm. The new sample may be of type similar to existing samples within the data set, so that it can be represented by the same feature set.

Next, a feature extraction engine 208 extracts features from file or object 204. For example, if pipeline 200 has been designed to operate on 10 features, then feature extraction engine 208 may extract those 10 features from the object. Features may include properties such as filename, file size, a checksum or hash of the file contents, the presence of certain strings within the binary (which may identify, for example, calling of certain functions or the use of certain toolkits. For objects that use Windows PowerShell, a Unix shell such as Bash, or other command interpreters, features may include tokenized command line arguments, or other similar data or metadata.

By way of further illustration, features for network security objects may include any or all of the following. This list is non-exhaustive and illustrative only.

TABLE 1

Example Static Features for Malware Samples

| | |
|---|---|
| hex_filesize | The size of the file |
| hex filelines | The number of rows in the byte view of the file |
| hex_str_len | The number of the corresponding length of string in the file |
| hex_1gram | The number of characters in the file |
| hex_entropy | The file's entropy |
| asm_register | The number of registry keys accessed or modified by the file |
| asm_opcode | The number of opcodes recognized |
| asm_dd | The number of occurrence of the pseudo instruction "dd" |
| asm_dw | The number of occurrence of the pseudo instruction "dw" |
| asm_symbol | The number of special symbols |
| pe_api | The number of suspicious API class |
| pe_dll | The number of dynamic link libraries (DLLs) accessed by the file |
| pe_imports | The number of imports |
| pe_exports | The number of exports |
| pe_mastiff | The information of Mastiff Report |
| pe_alertapi | The statistic number of malicious API |
| pe_compile | The compiling environment of sample |

Hexadecimal Bytecode Features

Bytecode can be observed as a series of hexadecimal character arrangements. It is the original form of malware and shows the fundamental outline of malware. Feature collection can directly read through the hexadecimal bytecode, and feature details are as follows:

File Size: Basic file information including the file size, number of file lines, and total number of file characters.

Visible String: Includes statistics of visible ASCII strings' length, with filters applied to reduce noise.

Program Entropy: The entropy of the program is a measure of the amount of disorder, which is a reflection of whether the malware sample obfuscates itself or makes other changes.

Assembler Code Features

Interactive Disassembler (IDA) is a static disassembly tool that supports multi-platform applications. IDA performs automatic code analysis, using cross-references between code sections, knowledge of parameters of API calls, and other information.

Register Features: The register is an important part of the assembly language, and different compilation environments have great influence on the type of compiler function register. The number of various types of registers may be extracted from the compiler function register.

Operation Code (Opcode): Opcode is a visual representation of the machine code, which is the most frequent element in the assembly language.

Data Definition Features: Considers some statistical information of data definition opcodes orders such as "db", "dd," and "dw." In the analysis of the shelling sample process, these samples are mainly made up of "db", "dd" and "dw" opcodes. Extracting these features may help to classify the shelling samples.

Portable Executable Structure View Feature

In cases where malware is delivered as a portable executable (PE), the PE header contains a large amount of software-related information. Software such as Exeinfo PE and Mastiff may be used to extract features related to the structure of executable objects. Mastiff is an open source command-based static analysis framework developed by the Defense Advanced Research Projects Agency (DARPA). It is mainly used to extract the structured information of PE files, and also supports the development of related plugins to provide static analysis of PDF, Word, and other format files. Exeinfo PE may be used by developers to check the compiler environment and maintain the compiler information database. The batch function provided by Exeinfo PE may be used to check the shelling information contained in malware. The PE structure features and compiler environment features provided by Mastiff and Exeinfo PE may be combined as PE structure view features, as detailed below.

PE Structured Information

The PE header contains a large number of software-related deep-level data, with related semantic information that can be analyzed. Important structural features may be extracted, including the number of API calls, the number of DLL calls, the number of import functions, the number of export functions, the starting virtual address, virtual size, language, and others.

Anti-Detection Features

Mastiff analysis reveals a series of antivirus measures made by malicious samples. Example malicious features include packers, virtual escape techniques, anti-debug techniques, and anti-virtual machine techniques.

Compile Features

The compilation time of the software and the compilation environment may be extracted, as well as shelling information. According to the difference of compiled information, accuracy of the characteristics of the compiler environment may be verified.

Malicious APIs

Researchers have analyzed more than 50 million malicious samples, arriving at the top 500 frequent APIs used by malware objects. In an illustrative example, the first 100 of these are considered, and their frequency is measured as a malicious API feature.

It should be noted that, although static features are disclosed here by way of illustration, dynamic features may also be used. Dynamic features could include, for example, behavioral features. Behavioral features include the behavior of the object while executing. The behavior can be observed and featurized, so that certain behaviors act as individual tokens for analysis.

The extracted features may be compiled into feature vector 212, which may be a data structure that includes the values for each feature. In an example, feature vector 212 is a class or structure that includes the individual feature vector elements, and optionally includes an additional member that is a representation of the full feature vector, such as a concatenated string of all features, a hash of such a string, or some other data derived from the feature vector that uniquely identifies the object.

Clustering engine 216 receives feature vector 212. In an illustrative example, clustering engine 216 concatenates the values from feature vector 212, or otherwise uses the data that uniquely identify the object, and performs a hash on the data, such as SHA256. This provides a 256-bit (32-bite) GUID that uniquely identifies object 204 with very high confidence.

In an illustration, the following data are extracted as features from an unknown Windows PowerShell script named "vM4y3wOH30uZ.ps1":

TABLE 2

|  | Example Feature Vector |
| --- | --- |
| Feature | Value |
| Filename | vM4y3wOH30uZ.ps1 |
| Hex Filesize | 0x11F36D8 |
| ASM Registers | 72 |
| ASM DD | 1047 |
| PE_DLL | 7 |
| EXE Info Dump (Base64 encoded) | RmlsZSBOYW1lOiBleGFtcGxlLmV4ZQpGaWxlIFNpemU6IDEuNSBN9pGaWxlIFR5cGU6IFBvcnRhYmxlIEV4ZWN1dGFibGUgKFBFKQpBcmNoaXRlY3R1cmU6IHg4NgpFbnRyeSBQb2ludDogMHgwMDQwMTAwMAoKU2VjdGlvbnM6CjEuIC50ZXh0IChDb2RlKQpFbIFNlY3Rpb24pCiAgIC0gVmlydHVhbCBBZGRyZXNzOiAweDAwNDAxMDAwCiAgIC0gU2l6ZTogNDAwIEtCCiAgIC0gQ2hhcmFjdGVyaXN0aWNzOiBSZWFKL0V4ZWN1dGUKCjIuIC5kYXRhIChEYXRhIFNlY3Rpb24pCiAgIC0gVmlydHVhbCBBZGRyZXNzOiAweDAwNDQyMDAwCiAgIC0gU2l6ZTogNTAgS0IKICAgLSBDaGFyYWN0ZXJpc3RpY3M6IFJlYWQvV3JpdGUKCkltcG9ydHM6Ci0gS2VybmVsMzIuZGxsCiAgLSBMb2FkTGlicmFyeUEKICAtIEdldFByb2NBZGRyZXNzCiAgLSBEcmVhdGVGaWxlQQogIC4uLgoKRXhwb3J0czoKLSBFeGFtcGxlRnVuY3Rpb25BCiAgLSBFeGhhbXBsZUZ1bmN0aW9u9otIC4uLgoKUmVzb3VyY2VzOgotIEljb246IEVEEwMSwgU2l6ZSAyIEtCCi0gU3RyaW5nOiBJRCAxMDIsIFNpemUgMTAwIGJ5dGVzCi0gLi4uCgpQYWNrZXI6IE5vbmUgZGV0ZWN0ZWQKQKQ29tcGlsZXI6IEp Y3Jvc29mdCBWaXN1YWwgQysrIDIwMTkKCkRpwMTkKCkRpZ2l0YWwgU2lnbmF0d XJlOgotIGotIE5vdCBwcmVzZW50CgoK |

This example feature vector can be concatenated into a single string as follows:

vM4y3wOH30uZ.ps10x11F36D87210477RmlsZSBOY-W1lOiBleGFtcGxl
LmV4ZQpGaWxlIFNpemU6IDEuNSBN9pGaWxlIFR5-cGU6IFBvcnRhYmx
llEV4ZWN1dGFibGUgKFBFKQpBcmNoaXRlY3R1c-mU6IHg4NgpFbnRyeS
BQb2ludDogMHgwMDQwMTAwMAoKU2VjdGlvb-nM6CjEuIC50ZXh0IC h
Db2RlIIFNlY3Rpb24pCiAgIC0gVmlydHVhbCBBZGR-yZXNzOiAweDAwND
AxMDAwCiAgIC0gU2l6ZTogNDAwIEtCCiAgIC0gQ-2hhcmFjdGVyaXN0a
WNzOiBSZWFKL0V4ZWN1dGUKCjIuIC5kYXRhIC-hEYXRhIFNlY3Rpb24p
CiAgIC0gVmlydHVhbCBBZGRyZXNzOiAweDAwN-DQyMDAwCiAgIC0gU
2l6ZTogNTAgS0IKICAgLSBDaGFyYWN0ZXJpc3Rp-Y3M6IFJlYWQvV3Jpd
GUKCkltcG9ydHM6Ci0gS2VybmVsMzIuZGxsCiAgL-SBMb2FkTGlicmFye
UEKICAtIEdldFByb2NBZGRyZXNzCiAgLSBDcmV-hdGVGaWxlQQogIC4u
LgoKRXhwb3J0czoKLSBFeGFtcGxlRnVuY3Rpb25-BCi0gRXhhbXBsZUZ1
bmN0aW9u9otIC4uLgoKUmVzb3VyY2VzOotIEljb-246IElEIDEwMSwgU2l6Z
SAyIEtCCi0gU3RyaW5n-OiBJRCAxMDIsIFNpemUgMTAwIGJ5dGVzCi
0gLi4uCgpQYWNrZXI6IE5vbmUgZGV0ZWN0ZW-QKQ29tcGlsZXI6IElp
Y3Jvc29mdCBWaXN1YWwgQysrIDIwMTkKCkRp-Z2l0YWwgU2lnbmF0d
XJlOgotIE5vdCBwcmVzZW50CgoK This string itself could be used as a GUID, as it is (or should be) unique, assuming the features have been appropriately selected. However, using the naked string may be undesirable in at least some cases, because it is quite long. Tens or hundreds of millions of such strings could take up substantial storage space. Furthermore, the string length is indeterminate between different objects (different objects may have different string lengths). In some cases, it may be desirable to reduce the concatenated string to a more compact and uniform size, using for example a checksum or hashing algorithm. In an example, a SHA256 hash is computed from the string, yielding a 256-bit (32 byte) GUID with very high confidence that there will be no collisions. The resulting GUID is:

8efc1e1c28c071f34198278b7fc63aeb892f25b36c65-394355f55638285 0715c

The foregoing GUID provides a compact representation of the object with very high confidence that no two objects will have the same GUID.

Clustering engine 216 may then map feature vector 212 into an n-dimensional space. For example, the foregoing example includes 6 features in the feature vector, so clustering engine 216 maps the object into a 6-dimensional space, with each feature value providing a coordinate within the 6-dimensional space. Within the 6-dimensional space, clustering engine 216 computes the distance between object 204 and each other object in the dataset (or a subset of objects in the dataset) according to a distance algorithm such as DBSCAN.

After computing the distance, clustering engine 216 may assign object 204 to a known cluster, assuming it clusters with a group of known objects (especially as a core point). Clustering engine 216 may assign at least a preliminary reputation to the object based on the cluster assignment. This preliminary reputation may be based on the assumption—usually good—that objects that cluster together generally have similar behavior and similar properties with regards to being either malicious or benign. In some cases, not all objects in the cluster have the same reputation. In those cases, a selection algorithm may be used, such as ceiling (taking the highest-reputation object from the cluster), floor (taking the lowest-reputation object from the cluster), mode (taking the most prevalent reputation from the objects in the cluster), median reputation, or mean reputation (in cases where reputations are represented numerically).

In decision block 220, the system determines whether the object should be treated as suspicious or not, based on the cluster assignment. If the object is suspicious, then in block 294 the system may perform additional analysis or take some other action to protect an enterprise or enterprises from the newly identified suspicious object.

In block 290 if the object is not suspicious, then the security services vendor may permit the object to operate on an enterprise or enterprises, at least provisionally until a more complete characterization or scan is performed.

Figure 3:
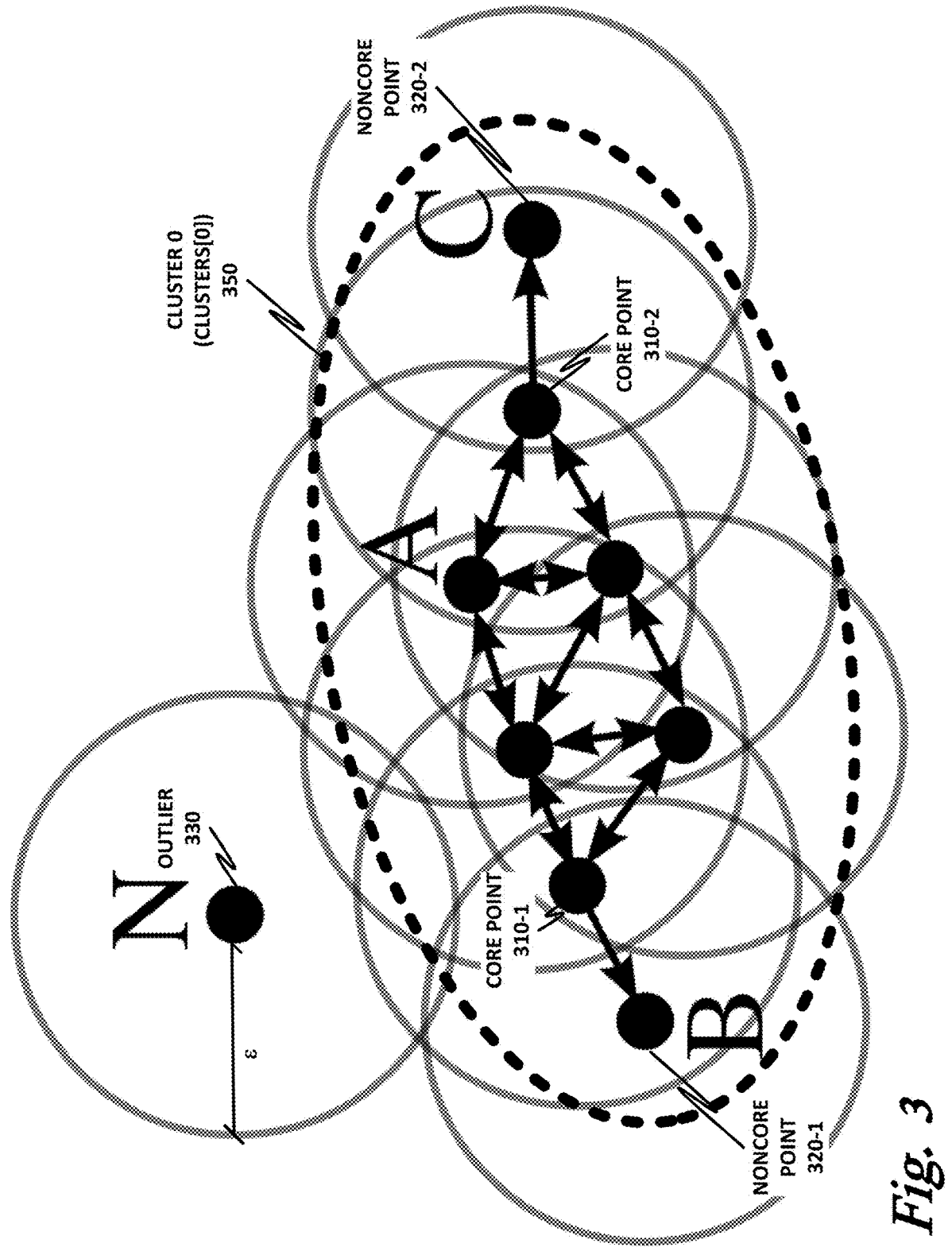
FIG. 3 is a block diagram illustration of selected aspects of a DBSCAN algorithm.

FIG. 3 is a block diagram illustration of selected aspects of a DBSCAN algorithm. The aspects illustrated in FIG. 3 may be applicable to existing systems or to a novel DBSCAN algorithm as disclosed herein. Furthermore, other clustering algorithms are also applicable to the teachings of this specification, some of which may use similar principles.

For simplicity, only a handful of points are illustrated here. As discussed above, a security services vendor with decades of data may have over one million objects in its database, or tens or hundreds of millions of objects. Other use cases may have different number of objects such as hundreds, thousands, tens of thousands, or hundreds of thousands. With the teachings of this specification, the number of objects may scale arbitrarily large, limited only by the availability of memory or storage to store the tables that map core points to cluster tags. As it is impractical to show millions of objects in this illustration, the few points illustrated here should be understood to stand for an arbitrarily large data set.

In this case, the system designer has featurized points and mapped them into an n-dimensional space. And in this illustration, the space appears to be a flat two-dimensional space, but this flat two-dimensional space should be understood to stand for any arbitrary n-dimensional space.

The system designer selects a distance factor ε, and computes an n-dimensional vector distance from each point to each other point, or from each point to a subset of points. An object that is within distance ε of another object groups with the other object. In this case, a cluster (called here "Cluster0" 350) can be defined in the n-dimensional space. By chance, Cluster0 350 occupies the "zero" position in the Clusters[ ] array as illustrated (i.e., Cluster0==Clusters[0]). Cluster0 350 includes core points 310 and non-core points 320. Core points 310 are within distance ε of at least k points, where k is selected at design time and k>1. In this illustration, k could be for example 3 or 4 (keeping in mind that point p is, by definition, within distance ε of itself). Point A and the other core points 310, such as core point 310-1, core point 310-2, and the cluster of core points between them are each within distance ε of at least k other points.

Point N 330 is an outlier, in that it is not within distance ε of any other points.

Points B and C are non-core points 320. These points sit on the fringes of Cluster0 350, and are within distance ε of at least one other point within cluster 350. However, because they are not within distance ε of at least k points, they are not a core part of Cluster0 350. Furthermore, non-core points 320 may possibly be assigned to more than one cluster, thus forming links between clusters. For example, point B could be within distance ε of core point 310-1, and could also be within distance ε of a core point for a different (unseen) cluster. Thus, if the data are rearranged, non-core points 320-1 and 320-2 could be assigned to a different cluster. Because the cluster assignments of non-core points 320-1 are nondeterministic across different runs of the DBSCAN algorithm, they may not be used to deterministically assign a cluster to a cluster tag. However, core points 310 are assigned to the same cluster regardless of the order of data. While the points are assigned to the same cluster, that cluster may receive a different position within the Clusters[ ] array between different runs of the DBSCAN algorithm. Thus, it is advantageous to provide GUIDs for each point, and in particular for core points 310, so that clusters within the Clusters[ ] array can be mapped to stateful, persistently-stored cluster tags. This provides cluster tag consistency across runs of DBSCAN, including across partial or incremental runs.

Figure 4:
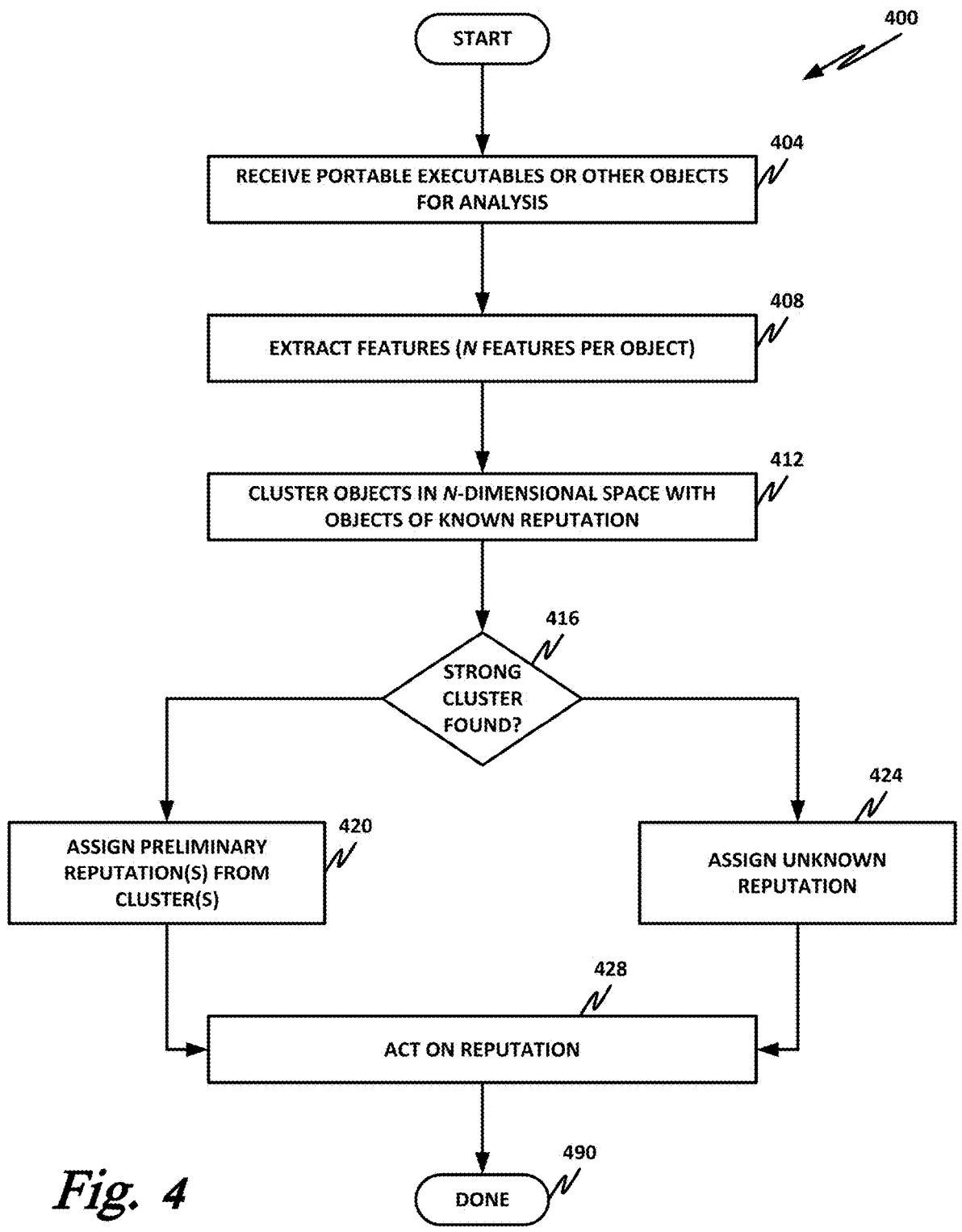
FIG. 4 is a flow chart of selected aspects of analyzing objects using a clustering algorithm.

FIG. 4 is a block diagram of a method 400 of performing malware analysis on a sample according to a clustering algorithm.

In block 404 the system receives a portable executable or other object or objects for analysis. This may be, for example, an object that has been newly identified in the wild, that has appeared for the first time in a protected enterprise, or that is the subject of a special request. The security services vendor wishes to determine whether the object is malicious or should be allowed to operate within the enterprise.

In block 408, the system may extract features from the object, such as extracting n features from the object, as illustrated herein.

In block 412, the system clusters the object in an n-dimensional space with other objects of known reputations, for example using DBSCAN or another appropriate distance algorithm.

In decision block 416, the system determines whether a strong cluster identification has been found. For example, is the object within distance ε of an object that forms a core point within a cluster of known objects? Strong identification may also depend on whether the object forms a core point within the cluster, or a noncore point. Total distance to the nearest object may also be a factor in determining how strongly the object identifies within a cluster.

In block 420, if the object strongly clustered with other objects of known reputation, then the system may assign the object a preliminary reputation from the cluster of known objects. For example, if the objects that the new object clustered with are known to be benign, then the object may be assigned a benign reputation. If the objects that the new object clustered with are known to be malicious, then the new object need may be assigned a malicious reputation.

Returning to decision block 416, if the object did not cluster strongly with other objects, then in block 424 the object may be assigned an unknown reputation.

In block 428, whether the object was assigned a known or an unknown reputation, the system may act on the reputation. For example, if the reputation is benign, then the object may be permitted (at least provisionally) to operate within a protected enterprise or may be treated as useful, and thus will not be inhibited from carrying out its functions.

Alternatively, if the object was assigned a suspicious or malicious reputation, then the system may take additional action such as blocking the object, quarantining the object, submitting the object for additional analysis by computer analysis or by a human security expert. Additional action may also include providing a warning to users before accessing the object, partially blocking functionality of the object, or other appropriate action.

In block 490 the method is done.

Figure 5:
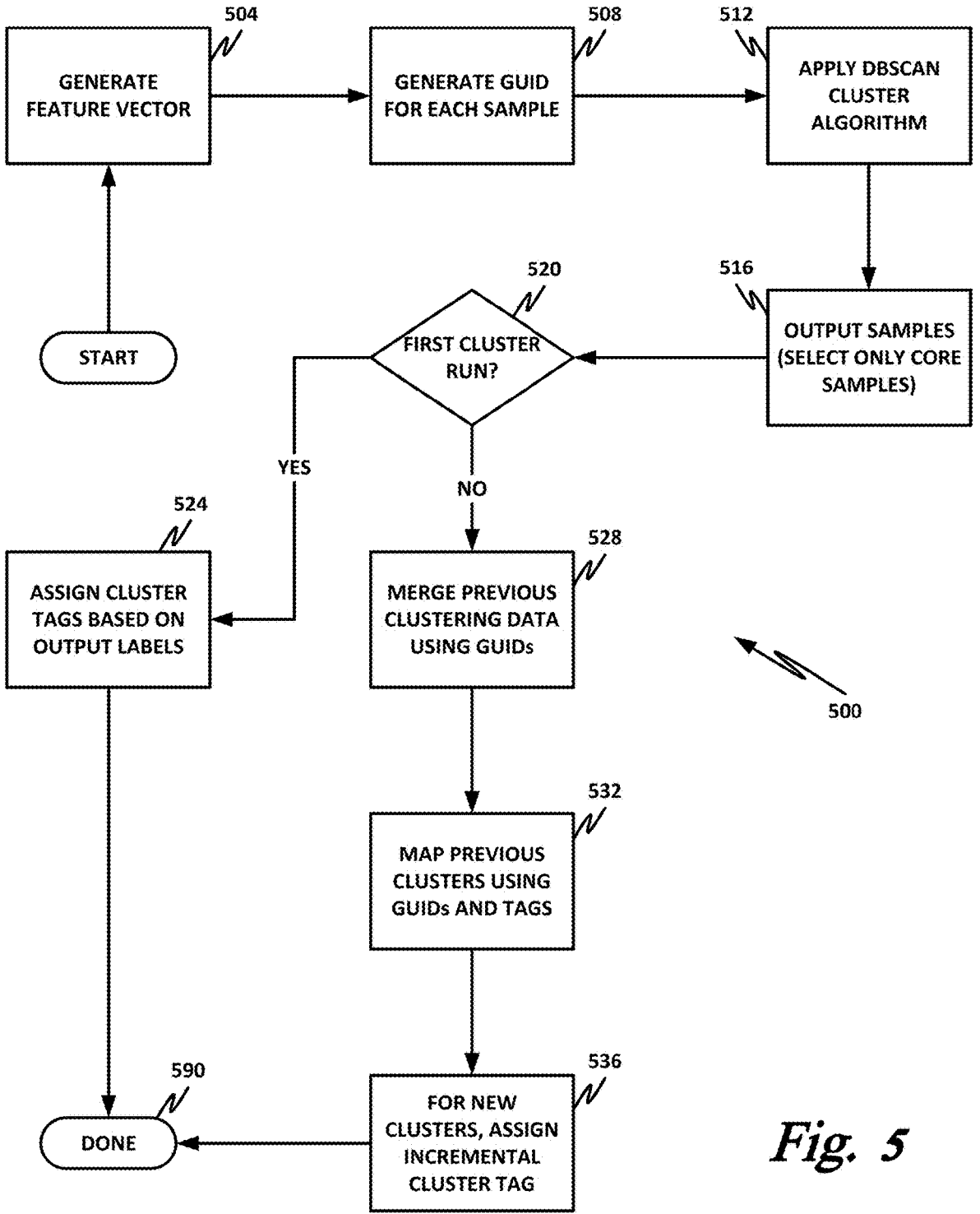
FIG. 5 is a flow chart of selected aspects of a stateful clustering method.

FIG. 5 is a flowchart of a method 500 of performing a DBSCAN or other clustering algorithm according to the teachings of the present specification.

In block 504, the system designer may first select a feature vector. Features may be selected so that different objects may generally have different feature vectors, or conversely, so that if two objects have the same feature vector, they may be assumed to be identical or at least functionally identical.

In block 508, the system generates a GUID for each sample. For example, the system may concatenate the values in the feature vector and perform a SHA256 on the concatenated string to provide a unique identifier for the object. In another example, other unique information from the feature vector may be used as an input to SHA256 or another hash. In another example, SHA256 or another hash may be performed on a binary representation of the object itself to form a suitable GUID.

In block 512, the system applies the DBSCAN algorithm to the set of objects or samples to be analyzed.

In block 516, the system receives an output of samples with their assigned clusters. In an illustrative example, the system retains only core samples between runs, because only core samples are truly stateful (non-core samples can map to different clusters by random chance). Thus, core samples can be used to determinatively map objects to their assigned clusters, and thus to identify clusters with cluster tags. Non-core points may be assigned to different clusters depending on the order in which the data are presented to the DBSCAN algorithm, and thus do not definitively define clusters. Outliers may not be useful in identifying clusters because they do not belong to a cluster.

In decision block 520, the system determines whether this is the first clustering run. If this is the first clustering run, then no cluster tags have been assigned to the generated clusters. Thus, in block 524, the system (or a human operator) may assign cluster tags based on the output labels. These cluster tags may be for example a GUID such as a SHA256 hash of data or metadata associated with the cluster, or they may be human readable cluster names, or some other clustered tag. The cluster tags are intended to persist between instances of the clustering algorithm.

Returning to decision block 520, if this is not the first cluster run, then in block 528 the system may merge previous clustering data using the GUIDs. This merging illustrates the ability to perform an incremental DBSCAN on a data set using only a selected subset of the data. Because the present specification teaches a stateful distance algorithm, the clusters will remain the same, including with the same cluster tags, regardless of the order in which the data are presented.

In block 532, the system may map previous clusters using the GUIDs and cluster tags. For example, consider four samples with five features each (as before, these four samples may stand for a much larger dataset):

TABLE 3

| | Features | | | | |
|---|---|---|---|---|---|
| | Feature_1 | Feature_2 | Feature_3 | Feature_4 | Feature_5 |
| Samples [0] | Value_A1 | Value_A2 | Value A3 | Value_A4 | Value_A5 |

TABLE 3-continued

| | Features | | | | |
|---|---|---|---|---|---|
| | Feature_1 | Feature_2 | Feature_3 | Feature_4 | Feature_5 |
| Samples [1] | Value_B1 | Value_B2 | Value_B3 | Value_B4 | Value_B5 |
| Samples [2] | Value_C1 | Value_C2 | Value_C3 | Value_C4 | Value_C5 |
| Samples [3] | Value_D1 | Value_D2 | Value_D3 | Value_D4 | Value_D5 |

A SHA256 GUID is computed for each sample as follows:

TABLE 4

| | GUIDs |
|---|---|
| | GUID |
| Samples[0] | 346dbd82c3c65450a2d43cddcd687b70459df6491e5a86b8a4e649fe7579eb6f |
| Samples[1] | 7101d70dcc88236d7f5f6640b0d855f9ff3d4679b57ffe1f2d77946ed41993c5 |
| Samples[2] | 627f683182583a75d8538846c45538c5f2f2b8731b12acd169db8c1f410162a4 |
| Samples[3] | 58cc0c2b409d01f292a1f7672bb8044a3d2187ac8b4e65b0f71ed98907b3ad67 |

After running DBSCAN, the objects may be assigned to clusters as follows:

TABLE 5

| | Cluster Assignments | |
|---|---|---|
| | GUID | Cluster Labels |
| Samples [0] | 346dbd82c3c65450a2d43cddcd687b70459df6491e5a86b8a4e649fe7579eb6f | Clusters[0] |
| Samples [1] | 7101d70dcc88236d7f5f6640b0d855f9ff3d4679b57ffe1f2d77946ed41993c5 | Clusters[1] |
| Samples [2] | 627f683182583a75d8538846c45538c5f2f2b8731b12acd169db8c1f410162a4 | Clusters[0] |
| Samples [3] | 58cc0c2b409d01f292a1f7672bb8044a3d2187ac8b4e65b0f71ed98907b3ad67 | Clusters[1] |

If this is the first instance of DBSCAN for this dataset, then the clusters may be assigned appropriate cluster tags. For example:

TABLE 6

| | Cluster Tags | |
|---|---|---|
| GUID | Cluster Labels | Cluster Tags |
| 346dbd82c3c65450a2d43cddcd687b70459df6491e5a86b8a4e649fe7579eb6f | Clusters[0] | Cluster_X |
| 7101d70dcc88236d7f5f6640b0d855f9ff3d4679b57ffe1f2d77946ed41993c5 | Clusters[1] | Cluster_Y |
| 627f683182583a75d8538846c45538c5f2f2b8731b12acd169db8c1f410162a4 | Clusters[0] | Cluster_X |
| 58cc0c2b409d01f292a1f7672bb8044a3d2187ac8b4e65b0f71ed98907b3ad67 | Clusters[1] | Cluster_Y |

On subsequent instances, the system may infer that whatever cluster GUID 346dbd82c3c65450a2d43cddcd687b70459df6491e5a8-6b8a4e649fe7 579eb6f (which occupied Samples[0] in the first run) is assigned to, that cluster is Cluster_X (assuming that this sample forms a core point in that cluster). Thus, the system may persistently store cluster assignments only for core points, as those are the points that have stateful data that persist across runs. For example, a later run with the same data in a different order may yield:

TABLE 7

| | Subsequent Instance | |
| --- | --- | --- |
| GUID | Cluster Labels | Cluster Tags |
| 346dbd82c3c65450a2d43cddcd687b704 59df6491e5a86b8a4e649fe7579eb6f | Clusters[1] | Cluster_X |
| 7101d70dcc88236d7f5f6640b0d855f9ff 3d4679b57ffe1f2d77946ed41993c5 | Clusters[0] | Cluster_Y |
| 627f683182583a75d8538846c45538c5f 2f2b8731b12acd169db8c1f410162a4 | Clusters[1] | Cluster_X |
| 58cc0c2b409d01f292a1f7672bb8044a3 d2187ac8b4e65b0f71ed98907b3ad67 | Clusters[0] | Cluster_Y |

A later incremental run of DBSCAN may add new objects to be analyzed. We may assume here, by way of illustration, that the four original points represent a subset of the original dataset. The incremental DBSCAN need not process the entire set, but rather can compare new objects to the subset to determine how they cluster:

TABLE 8

| | Incremental Run | | | | |
| --- | --- | --- | --- | --- | --- |
| | Feature_1 | Feature_2 | Feature_3 | Feature_4 | Feature 5 |
| Samples [0] | Value_A1 | Value_A2 | Value_A3 | Value_A4 | Value_A5 |
| Samples [1] | Value_B1 | Value_B2 | Value B3 | Value_B4 | Value_B5 |
| Samples [2] | Value_C1 | Value_C2 | Value_C3 | Value_C4 | Value_C5 |
| Samples [3] | Value_D1 | Value_D2 | Value_D3 | Value_D4 | Value_D5 |
| Samples [4] | Value_E1 | Value_E2 | Value_E3 | Value_E4 | Value_E5 |
| Samples [5] | Value_F1 | Value_F2 | Value_F3 | Value_F4 | Value_F5 |
| Samples [6] | Value_G1 | Value_G2 | Value_G3 | Value_G4 | Value_G5 |

New GUIDs are computed for each point. Because the GUID computation is one-way deterministic, the original samples will receive the same GUID, even if they are processed in a different order:

TABLE 9

| | Incremental GUIDs |
| --- | --- |
| | GUID |
| Samples[0] | 346dbd82c3c65450a2d43cddcd687b70459df6491e5a 86b8a4e649fe7579eb6f |
| Samples[1] | 7101d70dcc88236d7f5f6640b0d855f9ff3d4679b57ffe 1f2d77946ed41993c5 |
| Samples[2] | 627f683182583a75d8538846c45538c5f2f2b8731b12 acd169db8c1f410162a4 |
| Samples[3] | 58cc0c2b409d01f292a1f7672bb8044a3d2187ac8b4e 65b0f71ed98907b3ad67 |

TABLE 9-continued

| | Incremental GUIDs |
| --- | --- |
| | GUID |
| Samples[4] | 7cb1ddb3296fddbd9371b695f0aeaaee14937eb1e4d9 11b51adc8653c4c0c946 |
| Samples[5] | 96abc1c8c553df27ffdbfb02e11e86513f4f87aff909671 b18b34919ca207f78 |
| Samples[6] | 32a48b116dcaf3706b5clee954948162f3ae446cbc49f f1aa550d887f7b4debd |

The samples are clustered, as follows:

TABLE 10

| | Incremental Clustering | |
| --- | --- | --- |
| | GUID | Cluster Labels |
| Samples [0] | 346dbd82c3c65450a2d43cddcd687b7045 9df6491e5a86b8a4e649fe7579eb6f | Clusters[2] |
| Samples [1] | 7101d70dcc88236d7f5f6640b0d855f9ff3d 4679b57ffe1f2d77946ed41993c5 | Clusters[0] |
| Samples [2] | 627f683182583a75d8538846c45538c5f2f 2b8731b12acd169db8c1f410162a4 | Clusters[2] |
| Samples [3] | 58cc0c2b409d01f292a1f7672bb8044a3d2 187ac8b4e65b0f71ed98907b3ad67 | Clusters[0] |
| Samples [4] | 7cb1ddb3296fddbd9371b695f0aeaaee14 937eb1e4d911b51adc8653c4c0c946 | Clusters[1] |
| Samples [5] | 96abc1c8c553df27ffdbfb02e11e86513f4f 87aff909671b18b34919ca207f78 | Clusters[2] |
| Samples [6] | 32a48b116dcaf3706b5clee954948162f3 ae446cbc49ff1aa550d887f7b4debd | Clusters[1] |

Based on previously-stored cluster tags, the system determines that Clusters[2] is the cluster that was previously assigned tag "Cluster_X." The system also determines that Clusters[0] was previously assigned tag "Cluster_Y." Clusters[1] is a new cluster, and so did not receive a previous tag assignment. The system (or a human operator) may assign tag "Cluster_Z" to this new cluster. Final cluster assignments are:

TABLE 11

| | Final Cluster Assignments | |
| --- | --- | --- |
| GUID | Cluster Labels | Cluster Tags |
| 346dbd82c3c65450a2d43cddcd687b704 59df6491e5a86b8a4e649fe7579eb6f | Clusters[2] | Cluster_X |
| 7101d70dcc88236d7f5f6640b0d855f9ff 3d4679b57ffe1f2d77946ed41993c5 | Clusters[0] | Cluster_Y |
| 627f683182583a75d8538846c45538c5f 2f2b8731b12acd169db8c1f410162a4 | Clusters[2] | Cluster_X |
| 58cc0c2b409d01f292a1f7672bb8044a3 d2187ac8b4e65b0f71ed98907b3ad67 | Clusters[0] | Cluster_Y |
| 7cb1ddb3296fddbd9371b695f0aeaaee1 4937eb1e4d911b51adc8653c4c0c946 | Clusters[1] | Cluster_Z |
| 96abc1c8c553df27ffdbfb02e11e86513f4 f87aff909671b18b34919ca207f78 | Clusters[2] | Cluster_X |
| 32a48b116dcaf3706b5clee954948162f 3ae446cbc49ff1aa550d887f7b4debd | Clusters[1] | Cluster Z |

An inherent property of DBSCAN is that clusters will remain the same, although they may receive different labels or different positions within a Clusters[ ] array, depending on the order in which the data are presented. As illustrated in block 532, the cluster tags can be preserved by mapping GUIDs of core points to their assigned cluster tags. Because the clusters are the same, and because core points remain in the same cluster, the cluster tags associated with core point can be reliably mapped to the cluster assignments in the new DBSCAN run.

In block 536, if new clusters have been identified, the new clusters may be assigned new cluster tags according to the method used in block 524. Those clusters may then be available for subsequent incremental scans.

The cluster tags and GUIDs may be stored in an appropriate data store, such as a nonvolatile memory. The data may be stored in one embodiment in a database, such as a relational database, which may be transactional to provide atomicity, or a NoSQL database. In an embodiment, the data may also be stored in a structure that provides accelerated access, such as a content addressable memory (CAM) or a tertiary CAM (TCAM).

In block 590, the method is done.

Figure 6:
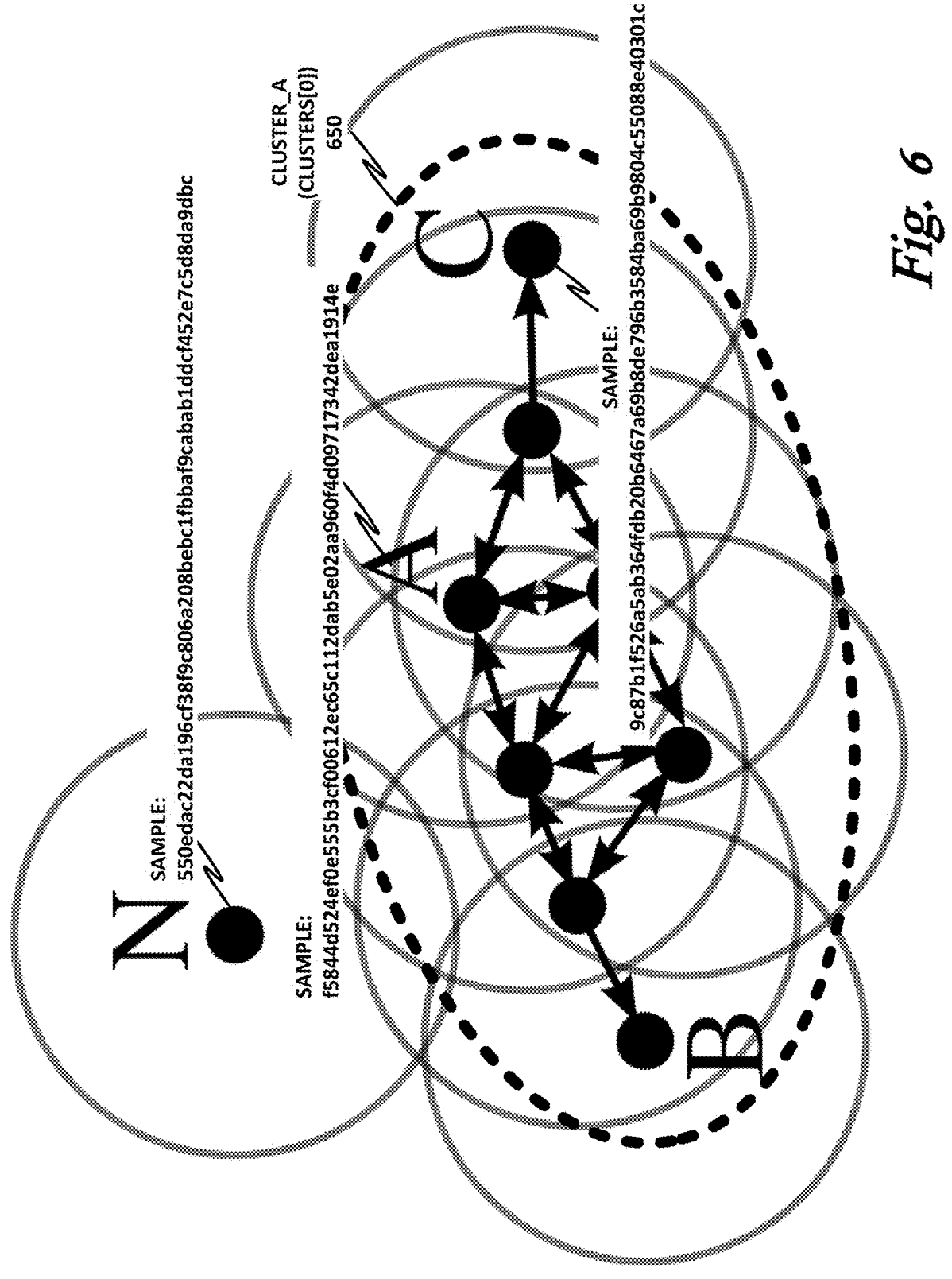
FIG. 6 is a block diagram illustrating results of a stateful clustering method.

FIG. 6 is a block diagram illustration of how the novel clustering algorithm may be used to incrementally assign points to an existing cluster. As illustrated here, the same data points are available, including points A, B, and C, which belong to cluster a 650, as well as point N, which does not belong to a cluster. In this case, each sample has been assigned a GUID, for example based on its feature vector. The GUID is a 32-byte value that is presumed to be unique for each sample, assuming that each unique sample has a unique feature vector. Of particular interest in this illustration are points A, C, and N. Each point has been assigned a SHA256 hash based on its feature vector. Sample N is an outlier that does not belong to any cluster because it is not within distance ε of any other point. Thus, sample N is not useful in maintaining a stateful representation between different instances of DBSCAN.

Point C belongs to ClusterA 650, but is a noncore point because it is not within distance ε of at least k points. Point C may not be useful in deterministically identifying a cluster tag, because on different runs, depending on the order of the data, noncore point C can be assigned to ClusterA or to a different cluster. Noncore point B would be similarly unreliable in identifying cluster tags.

On the other hand, core point A is within distance ε of at least k points. Thus, core point A will always be assigned to the same cluster, even if the data are reordered and CluasterA has a different position within the Clusters[ ] array. For example, in a previous run of the DBSCAN algorithm with the data presented in a different order, core point A may have been assigned to Clusters[2]. On that previous run, Clusters[2] was assigned the tag "ClusterA," (or "Cluster_X" or "Cluster-1" or "Metrocity" or "b6b3f958-3000-11ee-be56-0242ac120002" or any other label), which is its persistent and stateful identity between runs of DBSCAN.

In a subsequent run of DBSCAN, core point A was assigned to Clusters[0]. Because this cluster includes core point A (uniquely identified by its GUID), which as a core point reliably maps to the same cluster between instances, the system can determine that Clusters[0] (in this particular instance) is ClusterA. Because point A is a core point, it will not be assigned to a different cluster, regardless of which order the data are presented in. Thus, the system can deterministically map Clusters[0] to ClusterA, because Clusters[0] includes core point A, identified by its GUID. Indeed, any core point, with its associated known GUID, can be used to deterministically identify its associated cluster. In some cases, two, three, or more core points may be used to identify a cluster tag, for example as a cross-check to ensure data integrity.

Figure 7:
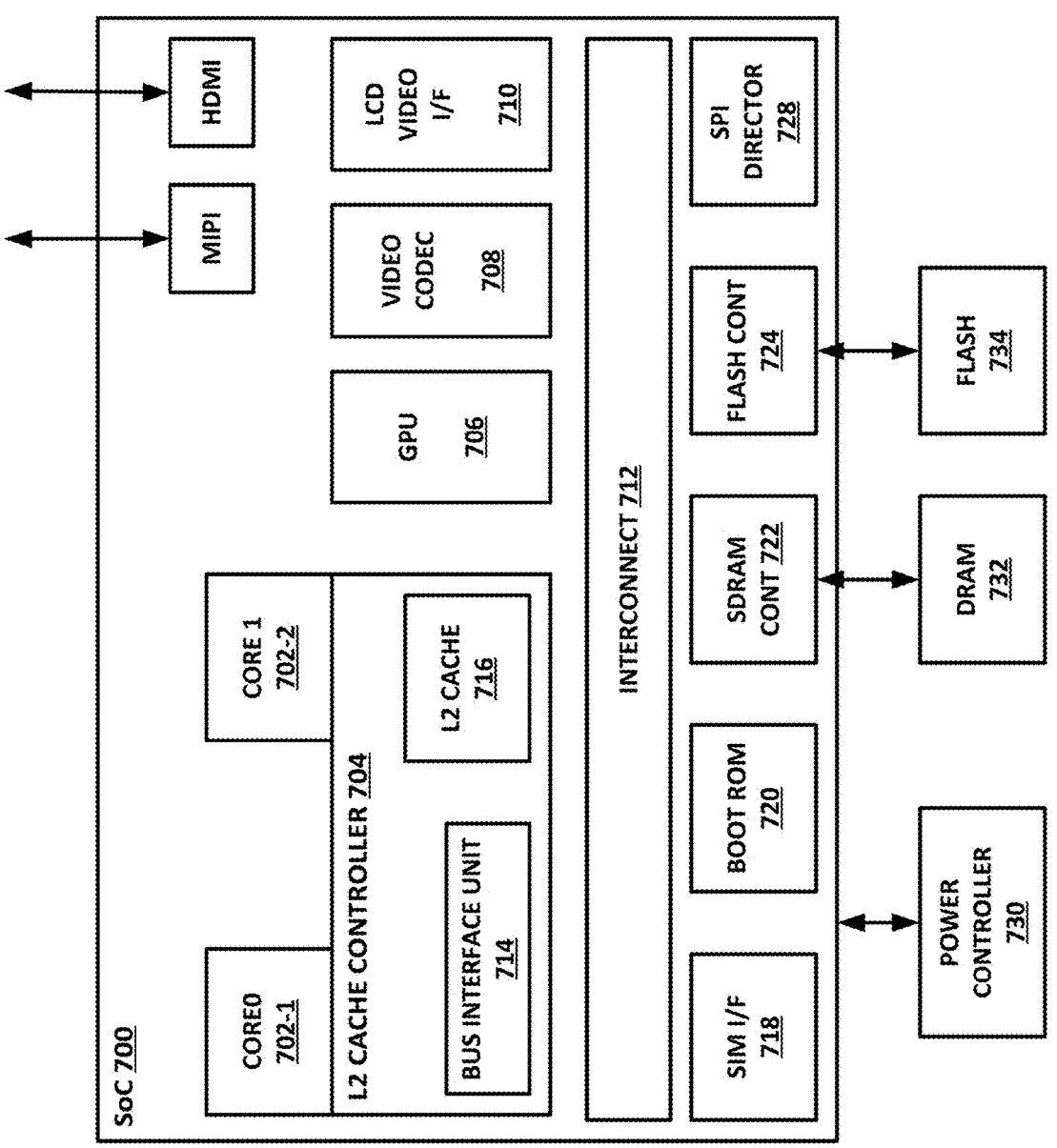
FIG. 7 is a block diagram of selected elements of a system-on-a-chip (SoC).

FIG. 7 is a block illustrating selected elements of an example SoC 700. At least some of the teachings of the present specification may be embodied on an SoC 700, or may be paired with an SoC 700. SoC 700 may include, or may be paired with, an advanced reduced instruction set computer machine (ARM) component. For example, SoC 700 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 700 could also be integrated into, for example, a PC, server, video processing components, laptop computer, notebook computer, netbook, or touch-enabled device.

As with hardware platform QB00 above, SoC 700 may include multiple cores 702-1 and 702-2. In this illustrative example, SoC 700 also includes an L2 cache control 704, a GPU 706, a video codec 708, a liquid crystal display (LCD) I/F 710 and an interconnect 712. L2 cache control 704 can include a bus interface unit 714, a L2 cache 716. Liquid crystal display (LCD) I/F 710 may be associated with mobile industry processor interface (MIPI)/HDMI links that couple to an LCD.

SoC 700 may also include a subscriber identity module (SIM) I/F 718, a boot ROM 720, a synchronous dynamic random access memory (SDRAM) controller 722, a flash controller 724, a serial peripheral interface (SPI) director 728, a suitable power control 730, a dynamic RAM (DRAM) 732, and flash 734. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 700 (or other integrated circuits) may use intellectual property blocks (IP blocks) to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 8 is a block diagram of a NFV infrastructure 800. NFV is an example of virtualization, and the virtualization infrastructure here can also be used to realize traditional VMs. Various functions described above may be realized as VMs, such as any of the modules illustrated in FIG. 2, sub-units of those modules, or other similar modules.

NFV is generally considered distinct from software defined networking (SDN), but they can interoperate together, and the teachings of this specification should also be understood to apply to SDN in appropriate circumstances. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be VMs). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 800. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 8, an NFV orchestrator 801 may manage several VNFs 812 running on an NFVI 800. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 801 a valuable system resource. Note that NFV orchestrator 801 may provide a browser-based or graphical configuration interface, and in some embodiments may be integrated with SDN orchestration functions.

Note that NFV orchestrator 801 itself may be virtualized (rather than a special-purpose hardware appliance). NFV orchestrator 801 may be integrated within an existing SDN system, wherein an operations support system (OSS) manages the SDN. This may interact with cloud resource management systems (e.g., OpenStack) to provide NFV orchestration. An NFVI 800 may include the hardware, software, and other infrastructure to enable VNFs to run. This may include a hardware platform 802 on which one or more VMs 804 may run. For example, hardware platform 802-1 in this example runs VMs 804-1 and 804-2. Hardware platform 802-2 runs VMs 804-3 and 804-4. Each hardware platform 802 may include a respective hypervisor 820, virtual machine manager (VMM), or similar function, which may include and run on a native (bare metal) operating system, which may be minimal so as to consume very few resources. For example, hardware platform 802-1 has hypervisor 820-1, and hardware platform 802-2 has hypervisor 820-2.

Hardware platforms 802 may be or comprise a rack or several racks of blade or slot servers (including, e.g., processors, memory, and storage), one or more data centers, other hardware resources distributed across one or more geographic locations, hardware switches, or network interfaces. An NFVI 800 may also include the software architecture that enables hypervisors to run and be managed by NFV orchestrator 801.

Running on NFVI 800 are VMs 804, each of which in this example is a VNF providing a virtual service appliance. Each VM 804 in this example includes an instance of the Data Plane Development Kit (DPDK) 816, a virtual operating system 808, and an application providing the VNF 812. For example, VM 804-1 has virtual OS 808-1, DPDK 816-1, and VNF 812-1. VM 804-2 has virtual OS 808-2, DPDK 816-2, and VNF 812-2. VM 804-3 has virtual OS 808-3, DPDK 816-3, and VNF 812-3. VM 804-4 has virtual OS 808-4, DPDK 816-4, and VNF 812-4.

Virtualized network functions could include, as nonlimiting and illustrative examples, firewalls, intrusion detection systems, load balancers, routers, session border controllers, DPI services, network address translation (NAT) modules, or call security association.

The illustration of FIG. 8 shows that a number of VNFs 804 have been provisioned and exist within NFVI 800. This FIGURE does not necessarily illustrate any relationship between the VNFs and the larger network, or the packet flows that NFVI 800 may employ.

The illustrated DPDK instances 816 provide a set of highly-optimized libraries for communicating across a virtual switch (vSwitch) 822. Like VMs 804, vSwitch 822 is provisioned and allocated by a hypervisor 820. The hypervisor uses a network interface to connect the hardware platform to the data center fabric (e.g., a host fabric interface (HFI)). This HFI may be shared by all VMs 804 running on a hardware platform 802. Thus, a vSwitch may be allocated to switch traffic between VMs 804. The vSwitch may be a pure software vSwitch (e.g., a shared memory vSwitch), which may be optimized so that data are not moved between memory locations, but rather, the data may stay in one place, and pointers may be passed between VMs 804 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 822 is illustrated, wherein vSwitch 822 is shared between two or more physical hardware platforms 802.

FIG. 9 is a block diagram of selected elements of a containerization infrastructure 900. Like virtualization, containerization is a popular form of providing a guest infrastructure. Various functions described herein may be containerized, such as any of the modules illustrated in FIG. 2, sub-units of those modules, or similar modules.

Containerization infrastructure 900 runs on a hardware platform such as containerized server 904. Containerized server 904 may provide processors, memory, one or more network interfaces, accelerators, and/or other hardware resources.

Running on containerized server 904 is a shared kernel 908. One distinction between containerization and virtualization is that containers run on a common kernel with the main operating system and with each other. In contrast, in virtualization, the processor and other hardware resources are abstracted or virtualized, and each virtual machine provides its own kernel on the virtualized hardware.

Running on shared kernel 908 is main operating system 912. Commonly, main operating system 912 is a Unix or Linux-based operating system, although containerization infrastructure is also available for other types of systems, including Microsoft Windows systems and Macintosh systems. Running on top of main operating system 912 is a containerization layer 916. For example, Docker is a popular containerization layer that runs on a number of operating systems, and relies on the Docker daemon. Newer operating systems (including Fedora Linux 32 and later) that use version 2 of the kernel control groups service (cgroups v2) feature appear to be incompatible with the Docker daemon. Thus, these systems may run with an alternative known as Podman that provides a containerization layer without a daemon.

Various factions debate the advantages and/or disadvantages of using a daemon-based containerization layer (e.g., Docker) versus one without a daemon (e.g., Podman). Such debates are outside the scope of the present specification, and when the present specification speaks of containerization, it is intended to include any containerization layer, whether it requires the use of a daemon or not.

Main operating system 912 may also provide services 918, which provide services and interprocess communication to userspace applications 920.

Services 918 and userspace applications 920 in this illustration are independent of any container.

As discussed above, a difference between containerization and virtualization is that containerization relies on a shared kernel. However, to maintain virtualization-like segregation, containers do not share interprocess communications, services, or many other resources. Some sharing of resources between containers can be approximated by permitting containers to map their internal file systems to a common mount point on the external file system. Because containers have a shared kernel with the main operating system 912, they inherit the same file and resource access permissions as those provided by shared kernel 908. For example, one popular application for containers is to run a plurality of web servers on the same physical hardware. The Docker daemon provides a shared socket, docker.sock, that is accessible by containers running under the same Docker daemon. Thus, one container can be configured to provide only a reverse proxy for mapping hypertext transfer protocol (HTTP) and hypertext transfer protocol secure (HTTPS) requests to various containers. This reverse proxy container can listen on docker.sock for newly spun up containers. When a container spins up that meets certain criteria, such as by specifying a listening port and/or virtual host, the reverse proxy can map HTTP or HTTPS requests to the specified virtual host to the designated virtual port. Thus, only the reverse proxy host may listen on ports 80 and 443, and any request to subdomain1.example.com may be directed to a virtual port on a first container, while requests to subdomain2.example.com may be directed to a virtual port on a second container.

Other than this limited sharing of files or resources, which generally is explicitly configured by an administrator of containerized server 904, the containers themselves are completely isolated from one another. However, because they share the same kernel, it is relatively easier to dynamically allocate compute resources such as CPU time and memory to the various containers. Furthermore, it is common practice to provide only a minimum set of services on a specific container, and the container does not need to include a full bootstrap loader because it shares the kernel with a containerization host (i.e. containerized server 904).

Thus, "spinning up" a container is often relatively faster than spinning up a new virtual machine that provides a similar service. Furthermore, a containerization host does not need to virtualize hardware resources, so containers access those resources natively and directly. While this provides some theoretical advantages over virtualization, modern hypervisors—especially type 1, or "bare metal," hypervisors—provide such near-native performance that this advantage may not always be realized.

In this example, containerized server 904 hosts two containers, namely container 930 and container 940.

Container 930 may include a minimal operating system 932 that runs on top of shared kernel 908. Note that a minimal operating system is provided as an illustrative example, and is not mandatory. In fact, container 930 may perform as full an operating system as is necessary or desirable. Minimal operating system 932 is used here as an example simply to illustrate that in common practice, the minimal operating system necessary to support the function of the container (which in common practice, is a single or monolithic function) is provided.

On top of minimal operating system 932, container 930 may provide one or more services 934. Finally, on top of services 934, container 930 may also provide userspace applications 936, as necessary.

Container 940 may include a minimal operating system 942 that runs on top of shared kernel 908. Note that a minimal operating system is provided as an illustrative example, and is not mandatory. In fact, container 940 may perform as full an operating system as is necessary or desirable. Minimal operating system 942 is used here as an example simply to illustrate that in common practice, the minimal operating system necessary to support the function of the container (which in common practice, is a single or monolithic function) is provided.

On top of minimal operating system 942, container 940 may provide one or more services 944. Finally, on top of services 944, container 940 may also provide userspace applications 946, as necessary.

Using containerization layer 916, containerized server 904 may run discrete containers, each one providing the minimal operating system and/or services necessary to provide a particular function. For example, containerized server 904 could include a mail server, a web server, a secure shell server, a file server, a weblog, cron services, a database server, and many other types of services. In theory, these could all be provided in a single container, but security and modularity advantages are realized by providing each of these discrete functions in a discrete container with its own minimal operating system necessary to provide those services.

The foregoing outlines features of several embodiments so that those skilled in the art may better understand various aspects of the present disclosure. The foregoing detailed description sets forth examples of apparatuses, methods, and systems relating to a system for providing a stateful clustering method in accordance with one or more embodiments of the present disclosure. Features such as structure(s), function(s), and/or characteristic(s), for example, are described with reference to one embodiment as a matter of convenience; various embodiments may be implemented with any suitable one or more of the described features.

As used throughout this specification, the phrase "an embodiment" is intended to refer to one or more embodiments. Furthermore, different uses of the phrase "an embodiment" may refer to different embodiments. The phrases "in another embodiment" or "in a different embodiment" refer to am embodiment different from the one previously described, or the same embodiment with additional features. For example, "in an embodiment, features may be present. In another embodiment, additional features may be present." The foregoing example could first refer to an embodiment with features A, B, and C, while the second could refer to an embodiment with features A, B, C, and D, with features, A, B, and D, with features, D, E, and F, or any other variation.

In the foregoing description, various aspects of the illustrative implementations may be described using terms commonly employed by those skilled in the art to convey the substance of their work to others skilled in the art. It will be apparent to those skilled in the art that the embodiments disclosed herein may be practiced with only some of the described aspects. For purposes of explanation, specific numbers, materials, and configurations are set forth to provide a thorough understanding of the illustrative implementations. In some cases, the embodiments disclosed may be practiced without the specific details. In other instances, well-known features are omitted or simplified so as not to obscure the illustrated embodiments.

For the purposes of the present disclosure and the appended claims, the article "a" refers to one or more of an item. The phrase "A or B" is intended to encompass the "inclusive or," e.g., A, B, or (A and B). "A and/or B" means A, B, or (A and B). For the purposes of the present disclosure, the phrase "A, B, and/or C" means A, B, C, (A and B), (A and C), (B and C), or (A, B, and C).

The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a nonvolatile memory. Thus, for example, an "engine" as described above could include instructions encoded within a volatile or nonvolatile memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, nontransitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, nontransitory computer-readable storage media having stored thereon executable instructions that, when executed, cause a hardware platform or other computing system, to carry out a method or procedure. For example, the instructions could be executable object code, including software instructions executable by a processor. The one or more tangible, nontransitory computer-readable storage media could include, by way of illustrative and nonlimiting example, a magnetic media (e.g., hard drive), a flash memory, a ROM, optical media (e.g., CD, DVD, Blu-Ray), nonvolatile random access memory (NVRAM), nonvolatile memory (NVM) (e.g., Intel 3D Xpoint), or other nontransitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected elements. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

To aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A computer-implemented method of assigning reputations to objects, comprising:

clustering samples in a dataset according to a density based spatial clustering of applications with noise (DB-SCAN) algorithm, comprising assigning a stateful globally unique or pseudo-unique identifier (GUID) for DBSCAN core points and storing persistent cluster tags for DBSCAN clusters;

for a new sample in the dataset, extracting n features from a sample into a feature vector, where n is an integer greater than 1;

assigning the new sample a stateful (GUID);

mapping the feature vector into an n-dimensional space and computing distances between the new sample and a plurality of core samples in the dataset;

identifying a cluster tag for a selected cluster that the new sample belongs to n-, comprising identifying a core sample that the new sample clusters with and correlating the GUID of the core sample to the cluster tag of its cluster;

assigning the new sample to the selected cluster, and assigning the new sample a reputation based on reputations of other samples in the selected cluster; and using the reputation to apply a computer security policy to the new sample.

2. The method of claim 1, wherein the dataset comprises data representing computer software objects, and wherein the reputation comprises a reputation for maliciousness.

3. The method of claim 2, wherein assigning the new sample the reputation comprises assigning the new sample a reputation for maliciousness prevalent among other samples in the selected cluster.

4. The method of claim 2, wherein assigning the new sample the reputation comprises computing a reputation from reputations of objects in the selected cluster, wherein the reputation is computed according to ceiling, floor, mode, median, or mean reputation.

5. The method of claim 4, wherein the reputation is a provisional reputation.

6. The method of claim 1, wherein the dataset is selected from geographical coordinate data, wherein the reputation comprises geographic proximity, image segmentation data, wherein the reputation comprises spatial proximity, market or customer segmentation data, wherein the reputation comprises target market segment or customer base discrimination, social network data, wherein the reputation comprises social connectivity, network analysis data, wherein the reputation comprises node density data, time series data, wherein the reputation comprises temporal proximity of events, or software objects, wherein the reputation comprises a reputation for maliciousness.

7. The method of claim 1, wherein assigning the GUID comprises concatenating values from the feature vector, and computing a single SHA256 hash of the concatenated values.

8. The method of claim 1, further comprising identifying one or more new clusters that do not have previously-assigned cluster tags, and assigning cluster tags to the new clusters.

9. The method of claim 1, wherein storing the persistent cluster tags comprises storing in a structured query language (SQL), NoSQL database, or a content-addressable memory.

10. One or more tangible, nontransitory computer-readable storage media having stored thereon executable instructions that, when executed by a processor circuit, cause the processor circuit to:

cluster samples in a dataset according to a density based spatial clustering of applications with noise (DB-SCAN) algorithm, comprising assigning a stateful globally unique or pseudo-unique identifier (GUID) for DBSCAN core points and storing persistent cluster tags for DBSCAN clusters;

for a new sample in the dataset, extract n features from a sample into a feature vector, where n is an integer greater than 1;

assign the new sample a stateful GUID;

map the feature vector into a multi-dimensional sample space, and compute distances between the new sample and a plurality of core samples in the dataset;

identify a cluster tag for a selected cluster that the new sample belongs to, comprising identifying a core sample that the new sample clusters with and that belongs to the selected cluster, and correlating the GUID of the core sample to the cluster tag of its cluster;

assign the new sample to the selected cluster, and assign the new sample a reputation based on reputations of other samples in the selected cluster; and use the reputation to apply a computer security policy to the new sample.

11. The one or more tangible, nontransitory computer-readable storage media of claim 10, wherein the persistent cluster tags are human-readable tags.

12. The one or more tangible, nontransitory computer-readable storage media of claim 10, wherein the dataset comprises more than one million objects.

13. The one or more tangible, nontransitory computer-readable storage media of claim 10, wherein clustering groups of objects comprises performing an incremental scan on a subset of the dataset comprising less than all the dataset.

14. The one or more tangible, nontransitory computer-readable storage media of claim 10, wherein the reputation is a provisional reputation.

15. The one or more tangible, nontransitory computer-readable storage media of claim 10, wherein the reputation comprises geographic proximity, image segmentation data, wherein the reputation comprises spatial proximity, market or customer segmentation data, wherein the reputation comprises target market segment or customer base discrimination, social network data, wherein the reputation comprises social connectivity, network analysis data, wherein the reputation comprises node density data, time series data, wherein the reputation comprises temporal proximity of events, or software objects, wherein the reputation comprises a reputation for maliciousness.

16. The one or more tangible, nontransitory computer-readable storage media of claim 10, wherein assigning the GUID comprises concatenating values from the feature vector, and computing a single SHA256 hash of the concatenated values.

17. The one or more tangible, nontransitory computer-readable storage media of claim 10, wherein the instructions are further to identify one or more new clusters that do not have previously-assigned cluster tags, and assigning cluster tags to the new clusters.

18. A computing apparatus realized on one or more hardware platforms, comprising:

at least one processor circuit;

at least one memory circuit;

a persistent cluster tag storage; and instructions encoded within the at least one memory circuit to instruct the at least one processor circuit to update clustering on a dataset previously clustered with a clustering algorithm, the instructions to:

cluster samples in a dataset according to a density based spatial clustering of applications with noise (DBSCAN) algorithm, comprising assigning a stateful globally unique or pseudo-unique identifier (GUID) for DBSCAN core points and store persistent cluster tags for DBSCAN clusters;

for a new sample in the dataset, create a feature vector comprising n discrete features, wherein n is an integer greater than 1;

assign the new sample a stateful GUID;

cluster the new sample based on its feature vector distance to core samples within the dataset, identify a cluster tag for a selected cluster that the new sample belongs to;

assign the new sample a reputation based on reputations of other samples in the selected cluster; and use the reputation to apply a computer security policy to the new sample.

19. The computing apparatus of claim 18, wherein the clustering algorithm is density-based spatial clustering of applications with noise (DBSCAN).

20. The computing apparatus of any of claim 18, wherein the clustering algorithm is a distance-based clustering algorithm.

\* \* \* \* \*